US011518276B2

(12) United States Patent
Meguro et al.

(10) Patent No.: US 11,518,276 B2
(45) Date of Patent: Dec. 6, 2022

(54) ADJUSTING DEVICE OF FRONT AND REAR POSITIONS OF SEAT

(71) Applicant: TS TECH CO., LTD., Saitama (JP)

(72) Inventors: Tsukasa Meguro, Tochigi (JP); Toshiaki Shimada, Tochigi (JP); Nobuyuki Tezuka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/289,645

(22) PCT Filed: Oct. 23, 2019

(86) PCT No.: PCT/JP2019/041494
§ 371 (c)(1),
(2) Date: Apr. 28, 2021

(87) PCT Pub. No.: WO2020/090575
PCT Pub. Date: May 7, 2020

(65) Prior Publication Data
US 2021/0394646 A1    Dec. 23, 2021

Related U.S. Application Data

(60) Provisional application No. 62/751,860, filed on Oct. 29, 2018, provisional application No. 62/751,874, filed on Oct. 29, 2018.

(51) Int. Cl.
*B60N 2/02* (2006.01)
*B60N 2/06* (2006.01)
*B60R 16/037* (2006.01)

(52) U.S. Cl.
CPC ........... *B60N 2/0232* (2013.01); *B60N 2/067* (2013.01); *B60R 16/037* (2013.01); *B60N 2002/0236* (2013.01)

(58) Field of Classification Search
CPC .............. B60N 2/0232; B60N 2/067; B60N 2002/0236; B60R 16/037
(Continued)

(56) References Cited

U.S. PATENT DOCUMENTS

2004/0222348 A1* 11/2004 Yokota ................ B60N 2/0875
248/429
2006/0226674 A1* 10/2006 Ito ........................ B60N 2/0705
296/65.13
(Continued)

FOREIGN PATENT DOCUMENTS

JP      H 05-330367 A      12/1993
JP      H 11-28954 A       2/1999
(Continued)

OTHER PUBLICATIONS

International Search Report with English Translation for PCT/JP2019/041494 dated Jan. 7, 2020 (4 pages).

*Primary Examiner* — Mark R Wendell
(74) *Attorney, Agent, or Firm* — Dority & Manning, P.A.

(57) ABSTRACT

In an arrangement which includes: a seat support body slidably supported on a fixed rail fixed to a floor; a power supply device supplying power to an electrical component on a seat side; and a drive device driving the seat support body in a front-and-rear direction and having a motor and a transmission member disposed so as to pass longitudinally through an interior of the fixed rail, the power supply device includes: a housing an electric wire for power supply; and a slider linked to the seat support body and slidable within the fixed rail. The electric wire is drawn out from the housing, retained by the slider and slidable within the fixed rail. The slider has an interference-avoiding portion for avoiding interference with the transmission member disposed so as to pass longitudinally through the interior of the fixed rail. Accordingly, the transmission member of the drive device
(Continued)

and the slider for retaining the electric wire, which slides within the fixed rail, can be arranged in proximity to each other within the fixed rail while avoiding interference therebetween, thus enabling simplification and a reduction in the size of a rail structure.

19 Claims, 12 Drawing Sheets

(58) Field of Classification Search
USPC .................................................. 297/344.1
See application file for complete search history.

(56) References Cited

U.S. PATENT DOCUMENTS

| | | | |
|---|---|---|---|
| 2008/0023613 A1* | 1/2008 | Brewer | B60N 2/0705 248/429 |
| 2014/0374563 A1* | 12/2014 | Tuji | B60N 2/067 248/429 |
| 2017/0267125 A1* | 9/2017 | Fujita | B60N 2/06 |
| 2020/0215936 A1* | 7/2020 | Teer | B60N 2/0707 |
| 2021/0053464 A1* | 2/2021 | Aktas | B60N 2/0715 |
| 2021/0114526 A1* | 4/2021 | Elsarelli | F16H 1/16 |

FOREIGN PATENT DOCUMENTS

| | | |
|---|---|---|
| JP | 2016-132304 A | 7/2016 |
| JP | 2016-134954 A | 7/2016 |
| JP | 2017-132319 A | 8/2017 |
| WO | WO 2010/070970 A1 | 6/2010 |

* cited by examiner

FIG.7
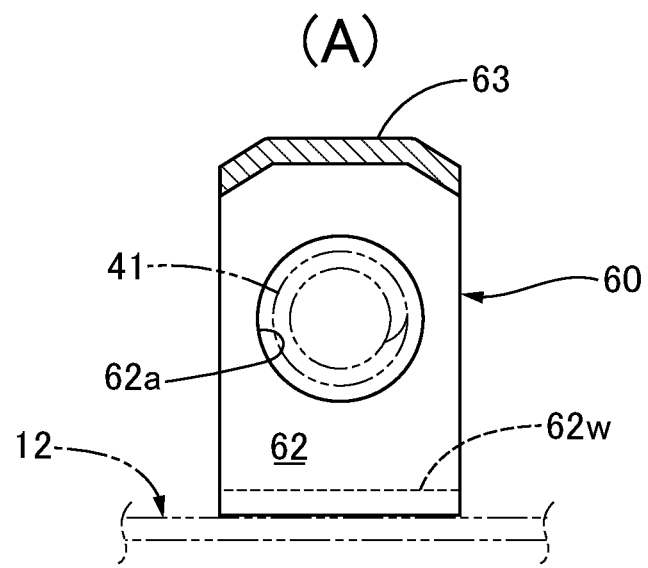
(A)
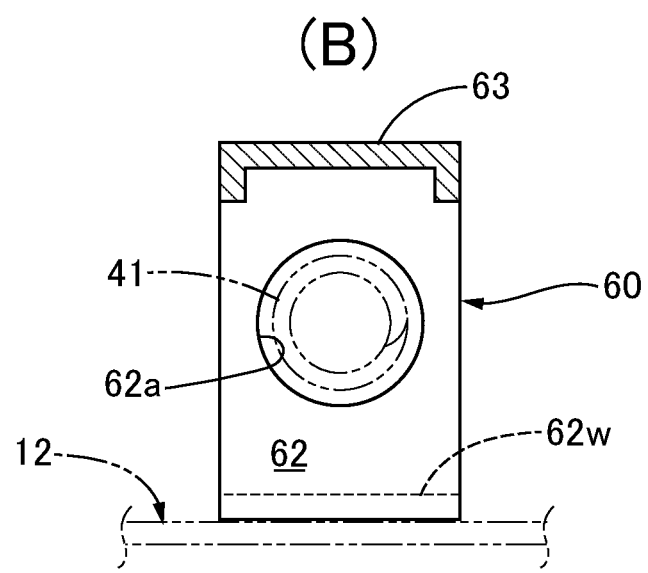
(B)

ADJUSTING DEVICE OF FRONT AND REAR POSITIONS OF SEAT

CROSS REFERENCE TO RELATED APPLICATIONS

This application is the U.S. National Stage entry of International Application Number PCT/JP2019/041494 filed under the Patent Cooperation Treaty having a filing date of Oct. 23, 2019, which claims priority to U.S. Provisional Patent No. 62/751,860 having a filing date of Oct. 29, 2018 and U.S. Provisional Patent No. 62/751,874 having a filing date of Oct. 29, 2018, which are incorporated herein by reference.

TECHNICAL FIELD

The present invention relates to an adjusting device of front and rear positions of a seat, particularly, an adjusting device of front and rear positions of a seat, the device comprising a fixed rail that is fixed to a floor and extends in a front-and-rear direction, a seat support body that is fixed to the seat and supported on the fixed rail so that the seat support body can slide in the front-and-rear direction, and a drive device that can drive the seat support body in the front-and-rear direction with respect to the fixed rail. It is noted that in the present Description, front/rear and left/right are with reference to the front/rear and left/right of a seat in a state in which it is set in a vehicle.

BACKGROUND ART

With regard to the adjusting device of front and rear positions of a seat, there is conventionally known, as shown in for example Patent Document 1, one in which a drive device for driving a seat support body in the front-and-rear direction has a motor provided on the seat side and a transmission member that is disposed so as to pass longitudinally through the interior of a fixed rail and is involved in the transmission of a driving force from the motor to the seat support body (more specifically, a fixed threaded shaft supported on the seat support body and screwed into a nut rotating in operative connection with the motor).

RELATED ART DOCUMENTS

Patent Documents

Patent Document 1: Japanese Patent Application Laid-open No. H11-28954
Patent Document 2: Japanese Patent Application Laid-open No. H05-330367

SUMMARY OF THE INVENTION

Problems to be Solved by the Invention

[First Problem]
In the seat of Patent Document 1, a power supply device supplying power to an electrical component on the seat side includes a power supply rail having a duct shape that is long in the front-and-rear direction and housing a power supply electric wire, and a slider slidably supported on the power supply rail and supporting a movable end part of the electric wire within the power supply rail, the slider being linked to the seat support body and being capable of moving in the front-and-rear direction together with the seat support body.

However, in this seat structure, in order for the slider to be slidably supported it is necessary to dispose and fix the power supply rail, which is formed into a duct shape that is long in the front-and-rear direction, side by side with and on the outside of the fixed rail. Because of this, there is a first problem that the overall rail structure is large and complicated and the degree of freedom in design of the structure for mounting the fixed rail on the floor is degraded due to the power supply rail.

The present invention has been proposed in light of the above circumstances, and it is a first object thereof to provide an adjusting device of front and rear positions of a seat that can solve the above first problem.

Second Problem

As shown in, for example, Patent Document 2, there is conventionally known an adjusting device of front and rear positions of a seat, particularly, one which includes a fixed rail fixed to a floor and extending in a front-and-rear direction, a movable rail fixed to the seat and supported on the fixed rail so as to be slidable in the front-and-rear direction, and a drive device capable of driving the movable rail in the front-and-rear direction with respect to the fixed rail, the drive device including a threaded shaft disposed so as to pass longitudinally through an interior of either one of the fixed rail and the movable rail, a nut member supported on the other one thereof and screwed around the threaded shaft, and a motor for carrying out relative rotation between the threaded shaft and the nut member.

However, in the seat of Patent Document 2, a stopper provided on the threaded shaft is made to abut against the nut member as a rigid body so as to define the forward limit or rearward limit of the movable rail (and therefore the seat) with respect to the fixed rail. Since the above stopper, however, has a flange shape that is flat in the front-and-rear direction, it is necessary for the stopper to be formed thick in the axial direction in order to enhance the support rigidity, and therefore, there is a second problem that it is disadvantageous for reducing the weight of the stopper. It is noted that in the configuration of Patent Document 2, the bearing member that supports the threaded shaft extending therethrough is disposed at an interval in the axial direction from the stopper, the bearing member having no function as a stopper.

It is a second object of the present invention to provide an adjusting device of front and rear positions of a seat that can solve the above second problem.

Means for Solving the Problems

Means for Solving the First Problem

In order to attain the above first object, according to a first aspect of the present invention, there is provided an adjusting device of front and rear positions of a seat, the device comprising a fixed rail that is fixed to a floor and extends in a front-and-rear direction, a seat support body that is fixed to the seat and supported on the fixed rail so that the seat support body can slide in the front-and-rear direction, a drive device that can drive the seat support body in the front-and-rear direction with respect to the fixed rail, and a power supply device that supplies power to an electrical component attached to the seat, characterized in that the drive device has a motor and a transmission member that is disposed so as to pass longitudinally through an interior of the fixed rail and is involved in transmission of driving force from the motor to the seat support body, the power supply device includes a housing that houses an electric wire for power supply, and a slider that is linked to the seat support body and can slide within the fixed rail, the electric wire being drawn out from the housing and retained by the slider so that the electric wire can slide within the fixed rail, and the slider has an interference-avoiding portion that avoids interference with the transmission member within the fixed rail.

Furthermore, according to a second aspect of the present invention, in addition to the first aspect, the slider has a pair of electric wire-retaining parts that are arranged across a gap in a left-and-right direction within the fixed rail and a linking part that provides a link between the electric wire-retaining parts, and the interference-avoiding portion is provided in a part, opposing the transmission member, of the linking part.

Moreover, according to a third aspect of the present invention, in addition to the second aspect, the slider is disposed so that at least part of each of the electric wire-retaining parts overlaps the transmission member when the seat is viewed from a side.

Furthermore, according to a fourth aspect of the present invention, in addition to the second or third aspect, the linking part has a top wall portion that covers an upper side of the transmission member and left and right side wall portions that extend vertically downward from left and right ends of the top wall portion, and the interference-avoiding portion, which has a squared U-shaped cross section, is formed from an inner face of the top wall portion and the left and right side wall portions.

Moreover, according to a fifth aspect of the present invention, in addition to the second or third aspect, the linking part has a top wall portion that covers an upper side of the transmission member and left and right side wall portions that extend obliquely downward from left and right ends of the top wall portion so as to widen in going toward tips of the side wall portions, respectively, and the interference-avoiding portion, which has a peak-shaped cross section, is formed from an inner face of each of the top wall portion and the left and right side wall portions.

Furthermore, according to a sixth aspect of the present invention, in addition to any one of the second to fifth aspects, a first recess portion, which is formed in the linking part so that an inner face thereof is recessed upward, forms the interference-avoiding portion, a bottom wall part of the fixed rail has a second recess portion that is formed by recessing a lower part of the bottom wall part at a position opposing the interference-avoiding portion, and the transmission member extends through a space sandwiched between the first and second recess portions.

Moreover, according to a seventh aspect of the present invention, in addition to any one of the first to sixth aspects, a threaded shaft forming the transmission member is rotatably supported on the fixed rail in a state in which movement in an axial direction is restricted, a nut member screwed around the threaded shaft being fixed to the seat support body, the motor and a transmission case of a transmission mechanism that transmits an output of the motor to the threaded shaft are mounted on one end part in a front-and-rear direction of the fixed rail, and the power supply device is disposed closer to another end part in the front-and-rear direction of the fixed rail than to the motor and the transmission case.

Furthermore, according to an eighth aspect of the present invention, in addition to the seventh aspect, the housing is disposed so as to be inclined toward a middle in a left-and-right direction of the seat with respect to the fixed rail in going toward the one end part of the fixed rail when viewed from above, and a base end part, from which the electric wire is drawn, of the housing is connected to the other end part of the fixed rail.

Moreover, according to a ninth aspect of the present invention, in addition to the seventh aspect, the housing is disposed so as to extend toward a middle in a left-and-right direction of the seat while being substantially orthogonal to the fixed rail when viewed from above, and a base end part, from which the electric wire is drawn, of the housing is connected to the other end part of the fixed rail.

Furthermore, according to a tenth aspect of the present invention, in addition to any one of the seventh to ninth aspects, a drive unit that includes the motor and the transmission case is disengageably latched with the one end part of the fixed rail via a plate spring member.

The 'fixed rail' of the present invention refers to, among a pair of left and right fixed rails L, L in an embodiment, a fixed rail in particular on which a slider 50 is slidably provided (the left fixed rail L in the embodiment).

Means for Solving the Second Problem

In order to attain the above second object, according to a first aspect of the present invention, there is provided an adjusting device of front and rear positions of a seat, the device comprising a fixed rail (L) that is fixed to a floor (F) and extends in a front-and-rear direction, a movable rail (U) that is fixed to the seat (S) and supported on the fixed rail (L) so that the movable rail (U) can slide in the front-and-rear direction, and a drive device (D) that can drive the movable rail (U) in the front-and-rear direction with respect to the fixed rail (L), the drive device (D) having a threaded shaft (41) disposed so as to pass longitudinally through an interior of either one rail (L) of the fixed rail (L) and the movable rail (U), a nut member (42) supported on another rail (U) thereof and screwed around the threaded shaft (41), and a motor (M) for carrying out relative rotation between the threaded shaft (41) and the nut member (42), characterized in that a bearing member (60) for supporting the threaded shaft (41) is fixed to the one rail (L), and includes a plurality of standing walls (61, 62) and a linking wall part (63), the standing walls (61, 62) having through holes (61*a*, 62*a*), respectively, through which the threaded shaft (41) is fitted, and being arranged across a gap in the front-and-rear direction, the linking wall part (63) providing an integral connection between extremities of the standing walls (61, 62), and the linking wall part (63) is formed so that a cross-sectional shape transecting the threaded shaft (41) is an arch shape or a bent shape in which at least a middle part protrudes toward a side away from the threaded shaft (41) or a side close thereto so that the middle part becomes an apex part. In accordance with this first aspect, since the bearing member fixed to the one rail and supporting the threaded shaft includes: the plurality of standing walls arranged across a gap in the front-and-rear direction and having the through holes, respectively, through which the threaded shaft is fitted; and the linking wall part providing an integral connection between the extremities of the standing walls, the bearing member can be stably supported on the one rail with a long support span in the front-and-rear direction even without the bearing member being formed thick in the front-and-rear direction. Moreover, since the linking wall part joining the plurality of standing walls to each other is formed so that the cross-sectional shape transecting the threaded shaft is an arch shape or a bent shape in which at least the middle part protrudes toward the side away from the threaded shaft or the side close thereto so that the middle part becomes an apex part, the bending stiffness of the linking wall part itself can be enhanced effectively. As a result, the bearing member can ensure a sufficient support rigidity toward the threaded shaft while lightening the weight of the bearing member.

Further, according to a second aspect of the present invention, in addition to the first aspect, among the plurality of standing walls (61, 62), the threaded shaft (41) is fitted without play and supported in the through hole (61*a*) of the standing wall(s) (61), which is part of the standing walls, and the threaded shaft (41) is fitted with play in the through hole (62*a*) of the standing wall(s) (62), which is remaining of the standing walls. In accordance with this second aspect, even when there are a plurality of the standing walls (and consequently the through holes), the through hole (bearing hole) for supporting the threaded shaft without play may be formed only in part of the plurality of standing walls, and therefore, this eliminates the necessity for strict coaxial precision between the plurality of through holes, thus making it possible to contribute to cutting the machining cost.

Further, according to a third aspect of the present invention, in addition to the second aspect, the bearing member (60) is formed from a bent band plate material, and the threaded shaft (41) is fitted and supported in the through hole (61*a*) of the standing wall(s) (61), which is said part of the standing walls, via a bearing bush (65). In accordance with this third aspect, even if the standing wall having the through hole as the bearing hole has a plate shape and is thin, any decrease in the support rigidity toward the threaded shaft can be minimized.

Further, according to a fourth aspect of the present invention, in addition to the second or third aspect, the standing wall(s) (61), which is said part of the standing walls, is disposed further outside in an axial direction of the threaded shaft (41) than the standing wall(s) (62), which is the remaining of the standing walls, and the standing wall(s) (62) as the remaining has a stopper face (62*s*), which engages directly or indirectly with the nut member (42) and restricts a forward limit or rearward limit of the movable rail (U). In accordance with this fourth aspect, the bearing member supporting the threaded shaft also functions as a stopper member restricting the forward limit or rearward limit of the movable rail, thus accordingly simplifying the structure. Furthermore, since the functions are divided such that, among the plurality of standing walls of the bearing member, the standing wall(s) on an outer side in the axial direction acts as a bearing wall and the standing wall(s) on an inner side in the axial direction acts as stopper means, the burden on each of the standing walls can be alleviated, thus further lightening the weight.

Further, according to a fifth aspect of the present invention, in addition to any one of the first to fourth aspects, extending walls (61*w*, 62*w*) extending toward sides opposite from each other in the front-and-rear direction are respectively connected integrally with base ends of first and second standing walls (61, 62), as said standing walls, arranged across a gap in the front-and-rear direction, and the bearing member (60) is joined to the one rail (L) via the extending walls (61*w*, 62*w*). In accordance with this fifth aspect, the support span of the one rail toward the bearing member can be increased due to the extension walls being specially provided, and the support rigidity toward the bearing member can be further enhanced.

Further, according to a sixth aspect of the present invention, in addition to the fourth aspect, a plate-shaped stopper wall part (71) through which the threaded shaft (41) extends at a position spaced from the nut member (42) in at least one of forward and backward directions is fixedly supported on the other rail (U) in a cantilever manner, and due to the stopper wall part (71) detachably abutting against the stopper face (62*s*), the forward limit or the rearward limit for the movable rail (U) are restricted. In accordance with this sixth aspect, since the plate-shaped stopper wall part undergo some elastic deformation, compared with a structure in which the nut member directly engages with the stopper face, the effect in absorbing impact at the time of engagement can be enhanced.

Further, according to a seventh aspect of the present invention, in addition to the fourth aspect, a pair of front and rear bearing members (60) as said bearing member (60) are fixed to the one rail (L) across a gap in the front-and-rear direction so as to sandwich the nut member (42) therebetween, a pair of front and rear stopper wall parts (71, 72), through which the threaded shaft (41) extends at positions spaced from the nut member (42) in one and another of forward and backward directions, are fixed to the other rail (U), and the pair of front and rear stopper wall parts (71, 72) detachably abut against the stopper faces (62*s*) of the pair of front and rear bearing members (60), respectively, thus restricting the forward limit and the rearward limit for the movable rail (U). In accordance with this seventh aspect, since there are specially provided the pair of front and rear stopper wall parts, through which the threaded shaft extends at positions spaced from the nut member in one and the other of the forward and backward directions, a region of an intermediate part of the threaded shaft that becomes free in a center run-out direction can be decreased, so that it is effective in suppressing center run-out of the threaded shaft.

Further, according to an eighth aspect of the present invention, in addition to the seventh aspect, a support plate (70) is disposed between the pair of front and rear bearing members (60) within the other rail (U), and has the pair of front and rear stopper wall parts (71, 72) and an intermediate wall part (73) having opposite ends connected respectively to the stopper wall parts (71, 72), extending in the front-and-rear direction, and being fixed to the other rail (U), and the intermediate wall part (73) has an intermediate bent portion (73*m*) that clasps the nut member (42) fixed to the other rail (U). In accordance with this eighth aspect, since the support plate is disposed between the pair of front and rear bearing members within the other rail, and has the pair of front and rear stopper wall parts and the intermediate wall part having the opposite ends connected respectively to the stopper wall parts, extending in the front-and-rear direction, and being fixed to the other rail, and the intermediate wall part has the intermediate bent portion that clasps the nut member fixed to the other rail, it is possible to form, easily with low cost by press forming a plate material, the single support plate having the pair of front and rear stopper wall parts and exhibiting a stopper function in both forward and backward directions. Moreover, it is possible to enhance the support strength for the nut member by utilizing the intermediate bent portion of the support plate.

Further, according to a ninth aspect of the present invention, in addition to the eighth aspect, a reinforcing portion (22*b*) is formed on the other rail (U) at a position where at least part thereof overlaps the support plate (70) in the axial direction. In accordance with this ninth aspect, it is possible to reinforce effectively, by the reinforcing portion, a region of the other rail where the burden is increased due to the support plate being fixed.

Further, according to a tenth aspect of the present invention, in addition to any one of the first to ninth aspects, the threaded shaft (41) is rotatably supported on the bearing member (60) fixed to the fixed rail (L) in a state in which movement in the axial direction of the threaded shaft (41) is restricted, the nut member (42) is fixed to the movable rail (U), the motor (M) and a transmission mechanism (30) that transmits an output of the motor (M) to the threaded shaft (41) are mounted on one end part (Lf) in the front-and-rear direction of the fixed rail (L), and a power supply device (E) for supplying power to an electrical component provided on the seat (S) is disposed closer to another end part (Lr) in the front-and-rear direction of the fixed rail (L) than to the motor (M) and the transmission mechanism (30). In accordance with this tenth aspect, it is possible to dispose the power supply device with a high degree of freedom while avoiding interference with the motor and the transmission mechanism. Moreover, due to the motor and the transmission mechanism being attached to the fixed rail, it is possible to effectively suppress transmission of vibration from the motor and the transmission mechanism to the seat side.

In the above means for solving the second problem, the fixed rail L configures one rail, the front end part Lf and the rear end part Lr of the fixed rail L configure respectively one end part and the other end part of the fixed rail, and moreover, the movable rail U configures the other rail, the first standing wall(s) 61 configures part of standing walls, and the second standing wall(s) 62 configures the remaining thereof.

Effects of the Invention

In accordance with the first aspect, with regard to the drive device, which can drive the seat support body in the front-and-rear direction with respect to the fixed rail, having the motor and the transmission member disposed so as to pass longitudinally through the interior of the fixed rail, the power supply device supplying power to an electrical component on the seat side includes the slider linked to the seat support body and being capable of sliding within the fixed rail, the electric wire for power supply, which is capable of sliding within the fixed rail, is retained on the slider, and the slider has the interference-avoiding portion for avoiding interference with the transmission member within the fixed rail. This enables the transmission member, which passes longitudinally through the interior of the fixed rail, of the drive device and the slider for retaining the electric wire, which slides within the fixed rail, to be arranged in proximity to each other within the fixed rail while avoiding interference therebetween, thus contributing to simplification and a reduction in the size of the overall rail structure. Even when the transmission member passes longitudinally through the interior of the fixed rail, since it is not necessary to specially provide slide-supporting means (e.g. a power supply rail of Patent Document 1) for the slider outside the fixed rail, the degree of freedom in design of the structure for mounting the fixed rail on the floor is enhanced.

Furthermore, in accordance with the second aspect, since the slider has the pair of electric wire-retaining parts arranged across a gap in the left-and-right direction within the fixed rail, and the linking part providing a link between the electric wire-retaining parts, and the interference-avoiding portion is provided on a part, opposing the transmission member, of the linking part, the interference-avoiding portion can be formed compactly without difficulty by utilizing the linking part linking the left and right electric wire-retaining parts, and it is therefore possible to suppress any increase in the lateral dimension of the fixed rail due to both the transmission member and the slider being disposed in the interior thereof.

Moreover, in accordance with the third aspect, since the slider is disposed so that at least part of each of the electric wire-retaining parts overlaps the transmission member when the seat is viewed from the side, it becomes possible to suppress any increase in the longitudinal dimension due to the fixed rail having both the slider and the transmission member disposed in the interior thereof.

Furthermore, in accordance with the fourth aspect, since the linking part has the top wall portion covering the upper side of the transmission member and the left and right side wall portions extending vertically downward from the left and right ends of the top wall portion, and the inner faces of the top wall portion and left and right side wall portions form the interference-avoiding portion having a squared U-shaped cross section, due to the left and right side wall portions of the interference-avoiding portion each being a vertical wall, it is possible to suppress any increase in the width in the left-and-right direction of the interference-avoiding portion, thus reducing the dimension in the left-and-right direction of the linking part, and consequently the slider.

Moreover, in accordance with the fifth aspect, since the linking part has the top wall portion covering the upper side of the transmission member and the left and right side wall portions extending obliquely downward from the left and right ends of the top wall portion so as to spread out in going toward the tip, and the inner faces of the top wall portion and left and right side wall portions form the interference-avoiding portion having a peak-shaped cross section, due to the slider having the lower half of the linking part spreading out in going toward the tip and downward, interference with the transmission member can be avoided without difficulty and, moreover, since the top wall portion of the linking part has a relatively small width, a portion of the slider that is exposed from the upper end of the fixed rail can be made small in the left-and-right direction, thus avoiding effectively interference with other objects.

Furthermore, in accordance with the sixth aspect, since the first recess portion, which is formed in the linking part so that the inner face thereof is recessed upward, forms the interference-avoiding portion, the bottom wall part of the fixed rail has the second recess portion, which is formed by recessing the lower part at least at the position opposing the interference-avoiding portion, and the transmission member extends through the space sandwiched between the first and second recess portions, it is possible to ensure a wide space for placing the transmission member and a component therearound due to the first and second recess portions. Moreover, since the part, corresponding to the second recess portion, of the bottom wall part of the fixed rail can exhibit a reinforcing rib effect, it is possible to contribute to an increase in the bending stiffness of the fixed rail.

Moreover, in accordance with the seventh aspect, since the threaded shaft forming the transmission member is rotatably supported on the fixed rail in a state in which movement in the axial direction is restricted, the nut member screwed around the threaded shaft is fixed to the seat support body, the motor and the transmission case of the transmission mechanism, which transmits the output of the motor to the threaded shaft, are mounted on one end part in the front-and-rear direction of the fixed rail, and the power supply device is disposed closer to the other end part in the front-and-rear direction of the fixed rail than to the motor and the transmission case, it is possible to avoid interference between the motor and transmission mechanism and the housing without difficulty, thus enhancing the degree of freedom in arrangement thereof. Moreover, it is possible to suppress effectively transmission of vibration from the motor and the transmission mechanism to the seat side, thus contributing to improvement of the ride comfort of the seat.

Furthermore, in accordance with the eighth aspect, since the housing is disposed so as to be inclined toward the middle in the left-and-right direction of the seat with respect to the fixed rail in going toward the one end part of the fixed rail when viewed from above, and the base end part, from which the electric wire is drawn, of the housing is connected to the other end part of the fixed rail, the housing can be disposed compactly in the front-and-rear direction in a dead space between the left and right fixed rails immediately below the seat. Moreover, due to the housing being inclined with respect to the fixed rail when viewed from above, compared with a case in which the housing is provided along the fixed rail, the curvature of the electric wire that is drawn out of the housing and bent back toward the fixed rail side can be reduced, and the electric wire can therefore be smoothly bent without difficulty.

Moreover, in accordance with the ninth aspect, since the housing is disposed so as to extend toward the middle in the left-and-right direction of the seat while being substantially orthogonal to the fixed rail when viewed from above, and the base end part, from which the electric wire is drawn, of the housing is connected to the other end part of the fixed rail, there is no possibility of the housing and a portion of the fixed rail fixed to the floor being superimposed on one another in the up-and-down direction, thus further improving the degree of freedom in design. Furthermore, due to the housing being substantially orthogonal to the fixed rail when viewed from above, compared with a case in which the housing is provided along the fixed rail, the curvature of the electric wire that is drawn out of the housing and curved toward the fixed rail side can be further reduced, and the electric wire can therefore be more smoothly bent.

Furthermore, in accordance with the tenth aspect, since the drive unit, which includes the motor and the transmission case, is disengageably latched with the one end part of the fixed rail via the plate spring member, not only does the ease of mounting the drive unit, including the motor and the transmission case, on the one end part of the fixed rail improve, but it is also possible to reduce effectively the amount of vibration transmitted from the motor and the transmission mechanism to the floor and the seat due to elastic deformation of the plate spring member.

BRIEF DESCRIPTION OF DRAWINGS

In FIG. 7, (A) and (B) are sectional views, corresponding to FIG. 5, showing first and second modified examples respectively of a bearing member.

EXPLANATION OF REFERENCE NUMERALS AND SYMBOLS

Figure 1:
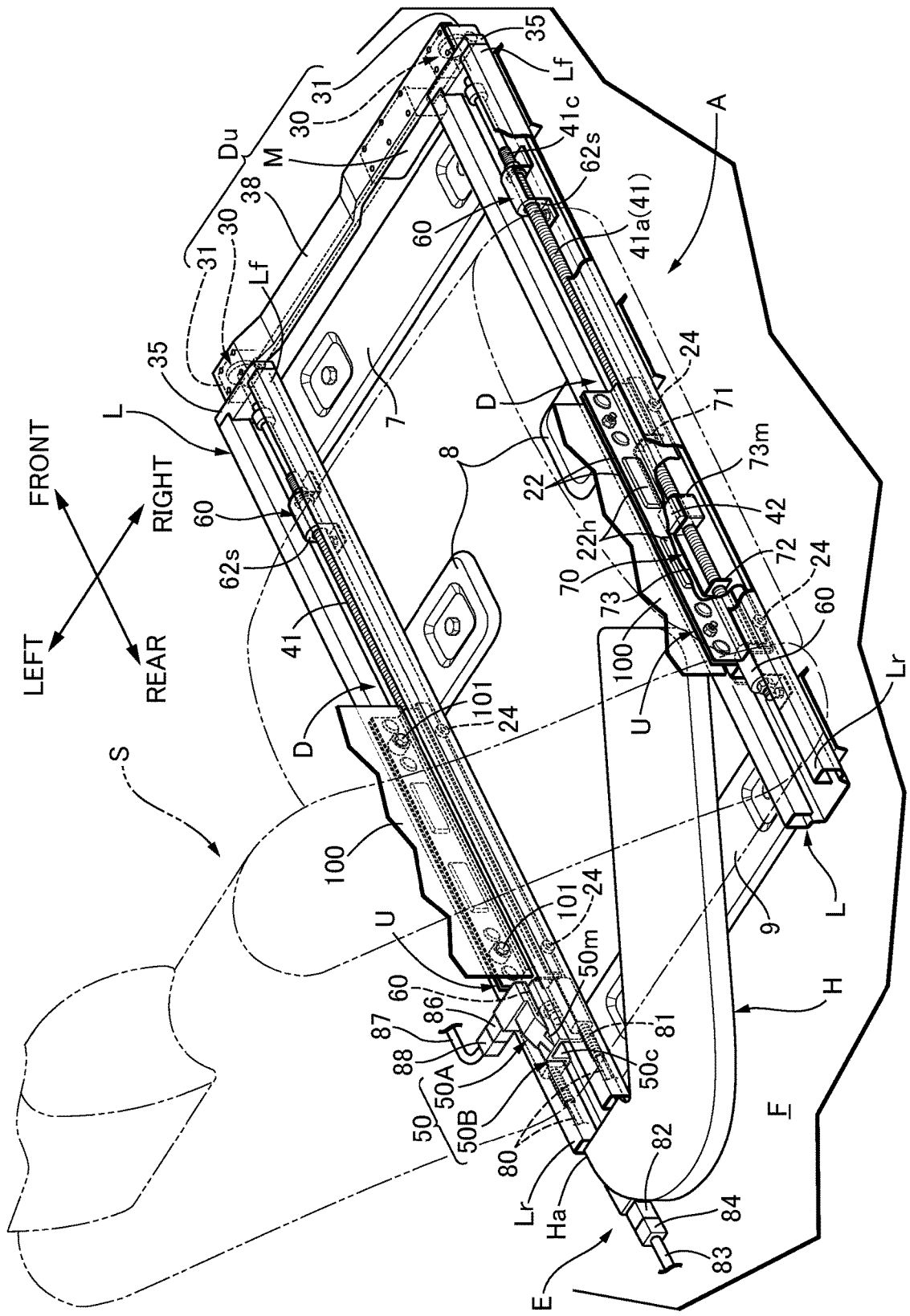
FIG. 1 is an overall perspective view showing one example of an adjusting device of front and rear positions of an automobile seat related to a first embodiment of the present invention.
Figure 2:
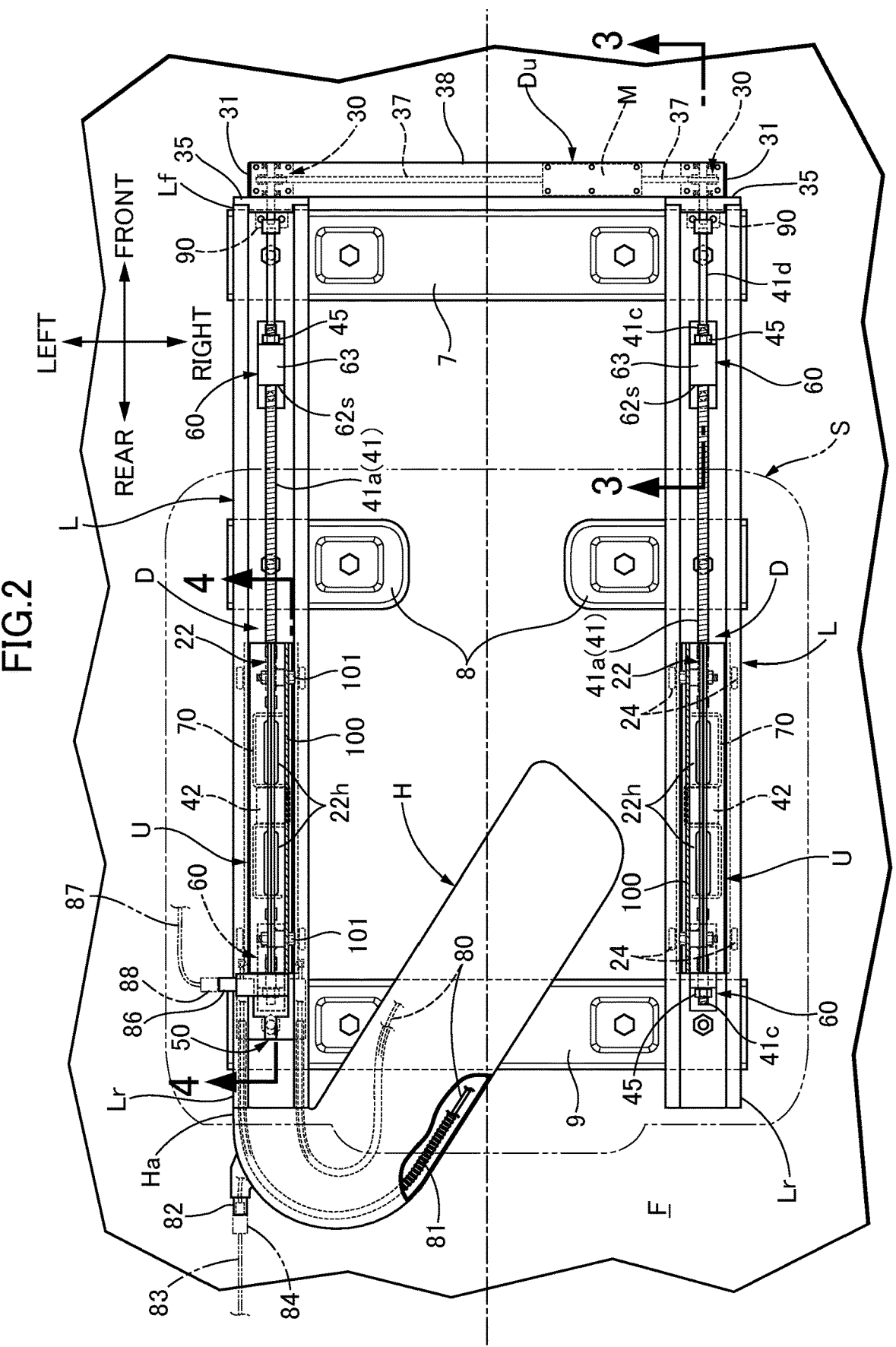
FIG. 2 is an overall plan view showing the adjusting device of front and rear positions.

A adjusting device of front and rear positions
D drive device
Du drive unit
E power supply device
F floor frame as floor
H housing
Ha base end part
L fixed rail
Lf, Lr front end part (one end part) and rear end part (another end part) of fixed rail
M motor
S seat for automobile as seat
U movable rail as seat support body
12 bottom wall part of fixed rail
12h second recess portion
30 transmission mechanism
31 gear box as transmission case
41 threaded shaft as transmission member
42 nut member
50 slider
50c interference-avoiding portion
51 linking part
51h first recess portion
51s left and right side wall portions
51t top wall portion
52, 53 pair of electric wire-retaining parts
80 electric wire
90 plate spring member

MODES FOR CARRYING OUT THE INVENTION

Embodiments of the present invention are explained below by reference to the attached drawings. In the present invention and the present specification, front/rear, left/right, and up/down are the front/rear, left/right, and up/down as viewed by an occupant seated on a seat.

A first embodiment is now explained referring to FIG. 1 to FIG. 6. A seat S for an automobile is supported on a floor frame F, which is part of a vehicle body, via an adjusting device A of front and rear positions so that the front and rear positions can be adjusted. The floor frame F is one example of a floor.

The adjusting device A of front and rear positions includes left and right fixed rails L that are fixedly (e.g. by means of a bolt) placed on the floor frame F via a plurality of support frames 7 to 9 and extend in the front-and-rear direction so as to be parallel to each other, left and right movable rails U as a seat support body supported on the respective fixed rail L so that they can slide in the front-and-rear direction, a drive device D that can drive the movable rail U (and consequently the seat S) with respect to the fixed rail L in the front-and-rear direction, and a power supply device E that supplies power to an electrical component, which is not illustrated, mounted on the seat S. The electrical component referred to here includes for example an electric reclining mechanism that is for adjusting the angle of inclination of a seat back, a seat sensor that detects the presence/absence of an occupant sifting on the seat S, and a seat belt sensor that detects whether an occupant on the seat is wearing a seat belt.

A downward-facing hanging wall part 100 is fixedly provided on a base plate of a seat part of the seat S, and an upper part of the movable rail U is detachably joined to the hanging wall part 100 via for example a plurality of pairs of bolts and nuts 101.

Furthermore, the plurality of support frames 7 to 9 are arranged at intervals in the front-and-rear direction on the floor frame F, some thereof (for example, the support frames 7 and 9 in the front and the rear) extend lengthwise in the left-and-right direction and function as cross members that join the left and right fixed rails L, and others (for example, the support frame 8 in the middle in the front-and-rear direction) are formed so as to be short in the left-and-right direction and are individually joined to the left and right fixed rails L. As joining means therefor, in this embodiment a weld nut and a bolt are used, but another joining means (e.g. welding) is also possible. The combination of long and short shapes for the support frames 7 to 9 is optional and is not limited to that of the embodiment. Furthermore, all of the support frames 7 to 9 may be short as for the support frame 8 of the embodiment or may be long as for the support frames 7 and 9 of the embodiment.

Figure 5:
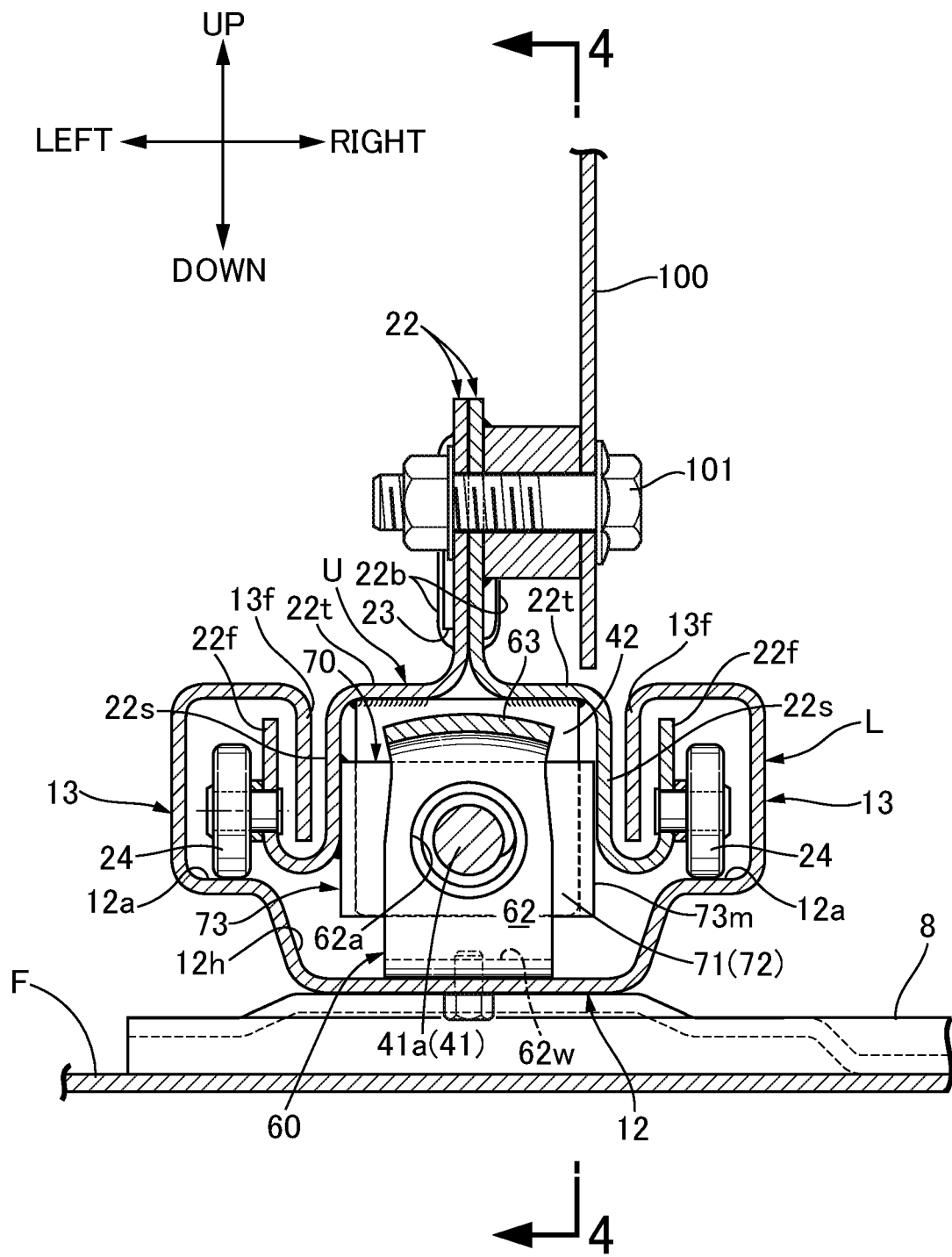
FIG. 5 is an enlarged sectional view along line 5-5 in FIG. 4.
Figure 6:
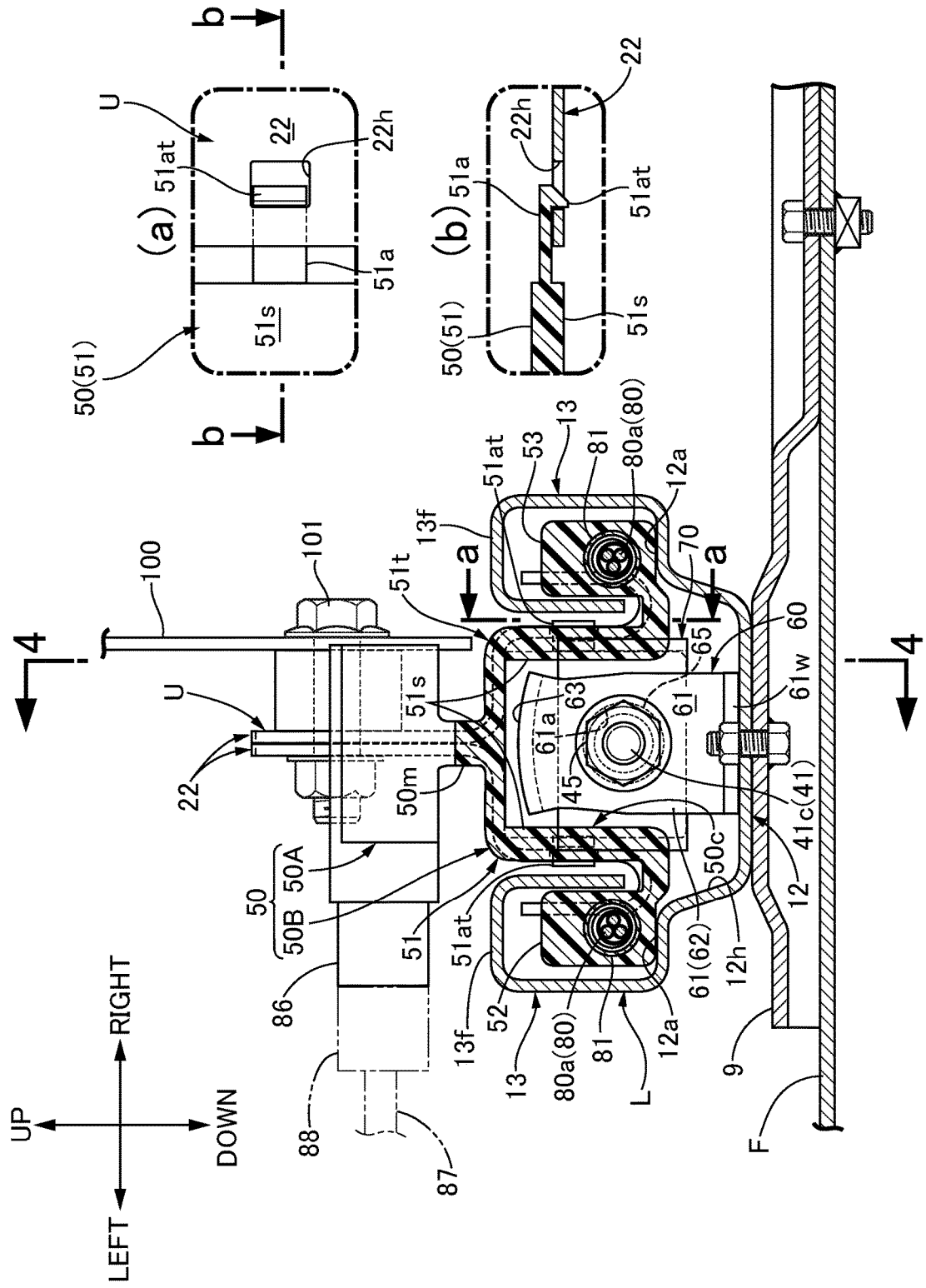
FIG. 6 is an enlarged sectional view along line 6-6 in FIG. 4.

Each of the left and right fixed rails L includes, as clearly shown in FIG. 5 in particular, a strip-shaped bottom wall part 12 extending in the front-and-rear direction, and substantially vertical left and right side wall parts 13 standing integrally with and above the left and right ends of the bottom wall part 12. The bottom wall part 12 has a recess portion 12h that is recessed downward in a middle part in the left-and-right direction, and left and right horizontal flat parts respectively connected to opposite sides of the recess portion 12h act as a travel guide face 12a for a roller 24, which is described later.

On the other hand, each of the left and right movable rails U is formed dividedly from left and right movable rail half bodies 22, and the movable rail half bodies 22 are integrally joined (e.g. by riveting 23) by abutting upper halves thereof against each other. Lower halves of the left and right movable rail half bodies 22 integrally have top wall portions 22t that are connected to the upper halves and protrude substantially horizontally toward opposite sides from each other, and side wall portions 22s that substantially vertically extend downward from outer ends of the top wall portions 22t. An upward-facing flange-shaped roller support portion 22f integrally and inversely extends upward from the lower end of each side wall portion 22s, and a pair of front and rear rollers 24 are rotatably and pivotally supported on each of the roller support portions 22f across a gap in the front-and-rear direction.

Flange portions 13f are connectedly provided integrally with the upper ends of the left and right side wall parts 13 of each fixed rail L, and the flange portions 13f are formed into an L-shaped cross section while having an inward-facing base part covering the upper side of the roller 24 and a downward-facing tip part extending substantially vertically downward from the inner end of the inward-facing base part. The downward-facing tip part of each of the flange portions 13f is loosely fitted into a gap between the side wall portion 22s and the roller support portion 22f of the movable rail U. The roller 24 of each movable rail U rolls on the travel guide face 12a of each fixed rail, thus allowing each movable rail U to slide smoothly on each fixed rail L in the front-and-rear direction via the roller 24.

One example of the drive device D, which drives the movable rail U (seat S) in the front-and-rear direction, is now explained.

The drive device D includes a threaded shaft 41 disposed so as to pass longitudinally through the interior of each of the left and right fixed rails L, front and rear bearing members 60 allowing front and rear end parts of the threaded shaft 41 to be rotatably supported on the fixed rail L, a nut member 42 screwed around the threaded shaft 41 between the front and rear bearing members 60 and fixed to the movable rail U, a motor M outputting rotational power for carrying out relative rotation between the threaded shaft 41 and the nut member 42, and a transmission mechanism 30 for transmitting the output of the motor M to the threaded shaft 41 and rotating the threaded shaft 41.

The nut member 42 is joined (e.g. welded) to an inner face of the lower half (more specifically, the top wall portion 22t) of the movable rail U. The threaded shaft 41 and the nut member 42 are in cooperation with each other and function as a transmission member that is involved in the transmission of driving force from the motor M to the movable rail U.

A drive unit Du that rotates the threaded shaft 41 is mounted on a front end part Lf of the left and right fixed rails L. This drive unit Du includes the motor M, left and right gear boxes 31 each housing the transmission mechanism 30, and a base frame 38 to which the motor M and the gear box 31 are joined (e.g. by means of a bolt), the base frame 38 being formed into a channel frame shape extending in the left-and-right direction. Due to the left and right gear boxes 31 being detachably joined to the front end parts Lf of the left and right fixed rails L respectively, the drive unit Du is mounted on the fixed rail L. The gear box 31 is one example of a transmission case.

The gear box 31 is dividedly formed from for example a gear box main body 311 and a lid body 312 detachably joined (e.g. press fitted) to an open end part thereof, and is formed into a box shape from a synthetic resin material. A side wall 31w, on the fixed rail L side, of the gear box 31 abuts against an outer face of a cover 35 that detachably blocks an opening of the front end part Lf of the fixed rail L, and is disengageably latched and fixed to the fixed rail L via a plate spring member 90 in the abutment state.

That is, a base part of the plate spring member 90 is joined (e.g. by means of a bolt) to the front end part Lf of the fixed rail L together with the support frame 7, and a latching claw 90a is provided at the tip part of the plate spring member 90 by cutting and raising part thereof. The gear box 31 has a slit hole 31s that opens on an outer face of the side wall 31w and into which the plate spring member 90 is removably inserted, and a latching hole 31h that opens on an inner face of the slit hole 31s and is capable of latching with the latching claw 90a.

Therefore, if the tip part of the plate spring member 90 is pushed into the slit hole 31s, the latching claw 90a can be automatically latched with the latching hole 31h, and the gear box 31, and consequently the drive unit Du, can therefore be latched and fixed to the left and right fixed rails L quickly and simply with a single touch, thus improving the ease of mounting the gear box 31 (drive unit Du) on the fixed rail L. Moreover, due to elastic deformation of the plate spring member 90, the amount of vibration transmitted from the motor M and the transmission mechanism 30 to the floor frame F and the seat S can be reduced effectively.

A motor shaft 37 extends out from the motor M in the left and right directions and projects into the left and right gear boxes 31, and a worm gear 37g is fitted and fixed to the outer periphery of an end part thus projecting. A transmission shaft 36 coaxially linked to the front end of the threaded shaft 41 via a joint J is rotatably supported on the gear box 31, and a worm wheel gear 36g is fitted and fixed to the outer periphery of an intermediate part of the transmission shaft 36, the worm wheel gear 36g meshing with the worm gear 37g and transmitting rotation of the motor shaft 37 to the transmission shaft 36 (and consequently the threaded shaft 41).

Figure 3:
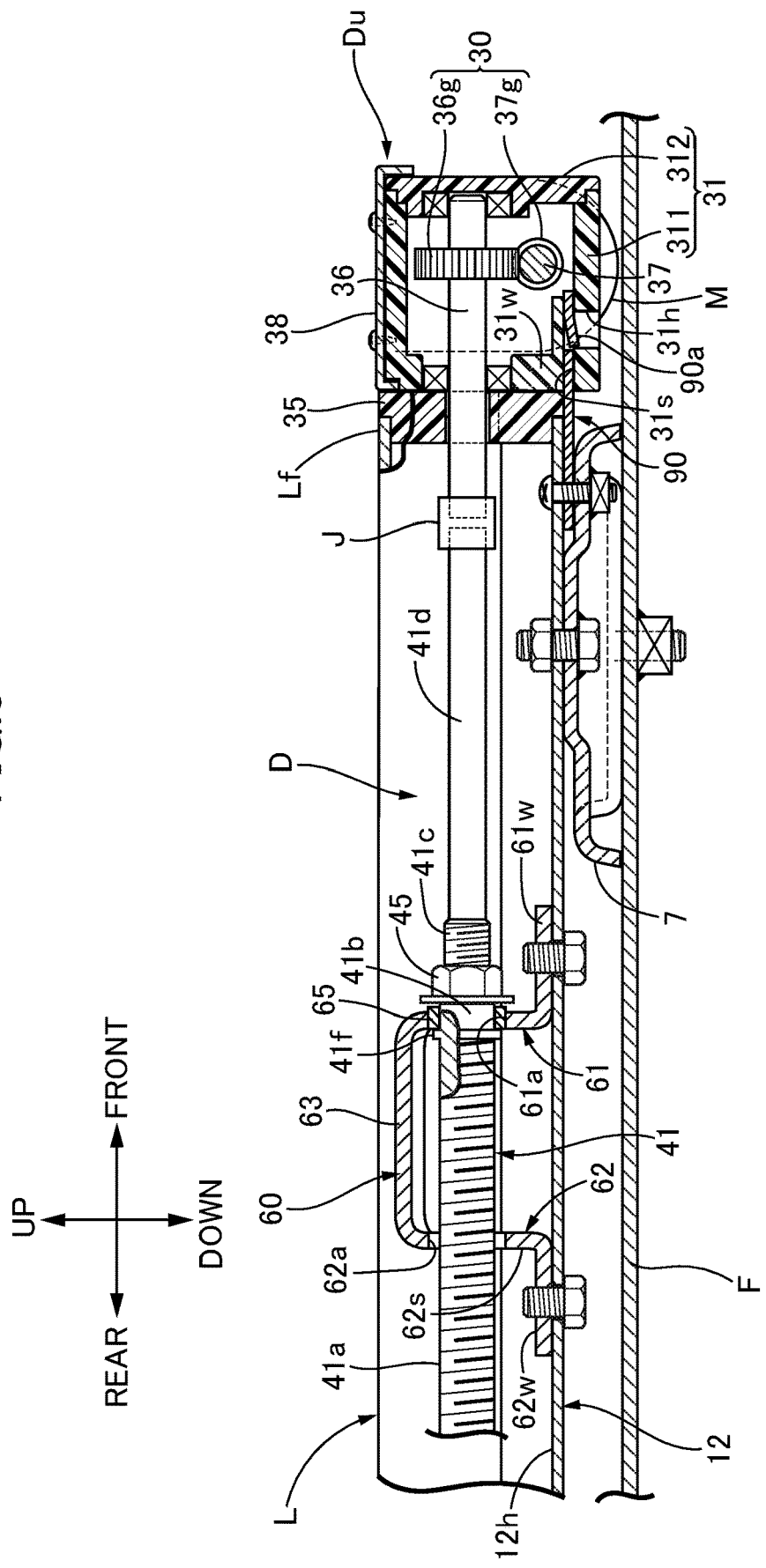
FIG. 3 is an enlarged sectional view along line 3-3 in FIG. 2.
Figure 4:
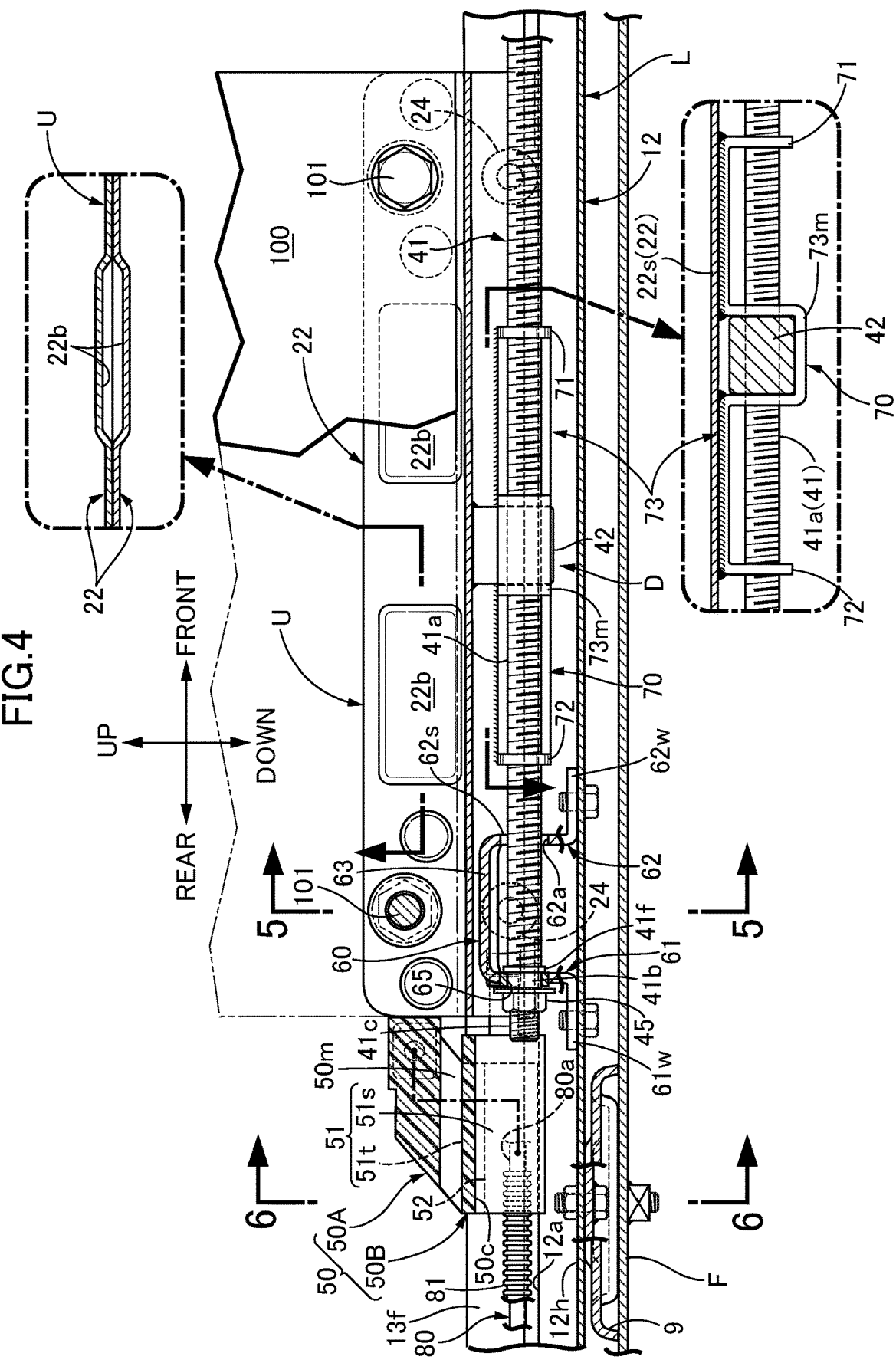
FIG. 4 is an enlarged sectional view along line 4-4 in FIG. 2 (sectional view along line 4-4 in FIG. 2, FIG. 5, and FIG. 6).

One example of the bearing member 60 is now explained mainly by reference to FIG. 3 to FIG. 5. The bearing member 60 has an intermediate part in the longitudinal direction formed from a bent band plate material, and includes for example first and second standing walls 61 and 62 that are arranged across a gap in the front-and-rear direction while each having through holes 61a and 62a through which the threaded shaft 41 is fitted, and a linking wall part 63 that integrally joins tip ends (upper ends) of the standing walls 61 and 62 to each other.

Extending walls 61w and 62w extending toward sides opposite from each other in the front-and-rear direction are connectedly provided integrally with base ends (lower ends) of the first and second standing walls 61 and 62 respectively, and the bearing member 60 is joined (e.g. by means of a bolt) to the bottom wall part 12 of the fixed rail L by means of the extending walls 61w and 62w.

With regard to the linking wall part 63, a cross-sectional shape that transects the threaded shaft 41 is an arch shape. The cross-sectional shape of the linking wall part 63 is not limited to the illustrated example; it may be a bent shape that protrudes toward the side further away from or the side closer to the threaded shaft 41 so that at least a middle part is an apex part, and may be for example a peak shape, as shown in FIG. 7 (A), in which only the middle part protrudes toward the side further away from the threaded shaft 41 or a squared U-shape, as shown in FIG. 7 (B), in which the opening faces downward. Although not illustrated, in a manner that is opposite to that in FIG. 7, the cross-sectional shape of the linking wall part 63 may be a peak shape in which only a middle part protrudes toward the side closer to the threaded shaft 41 or may be a squared U-shape in which the opening faces upward.

The threaded shaft 41 is fitted without play and supported via a bearing bush 65 in one of the first and second standing walls 61 and 62 (in the illustrated example one on the outer side in the axial direction), that is, the through hole 61a of the first standing wall 61, and the threaded shaft 41 is fitted with play into the other (in the illustrated example one on the inner side in the axial direction), that is, the through hole 62a of the second standing wall 62. A modified example in which the bearing bush 65 is omitted and the threaded shaft 41 is rotatably fitted and supported directly in the through hole 61a can also be implemented.

The threaded shaft 41 integrally has a large-diameter first male thread portion 41a around which the nut member 42 is screwed, a bush support portion 41b that is adjacent to front and rear ends of the first male thread portion 41a via a flange portion 41f and around which the bearing bush 65 is fitted, and a small-diameter second male thread portion 41c that is adjacent to the outer end of the bush support portion 41b via a step part.

A nut 45 that closely opposes the outer end of the bearing bush 65 is screwed around each of the left and right second male thread portions 41c, the nut 45 engaging with the first standing wall 61 of the bearing member 60 to thus restrict axial movement of the threaded shaft 41. An extending shaft portion 41d having a yet smaller diameter is provided so as to be connected to the second male thread portion 41c, on the front side in particular, of the threaded shaft 41, and the extending shaft portion 41d is connected to the transmission shaft 36 on the gear box 31 side via the joint J.

The second standing wall 62 has a stopper face 62s that indirectly engages with the nut member 42 (that is, via a support plate 70, which is explained below) to thus restrict the forward limit or the rearward limit of the movable rail U.

The support plate 70 includes front and rear stopper wall parts 71 and 72 that are arranged across a gap in the front-and-rear direction while each having a through hole through which the threaded shaft 41 slightly loosely extends, and an intermediate wall part 73 that extends lengthwise in the front-and-rear direction while having opposite ends thereof integrally connected to the stopper wall parts 71 and 72. The support plate 70 is disposed within the movable rail U between the front and rear bearing members 60, and the intermediate wall part 73 has an intermediate bent portion 73m that clasps the nut member 42 fixed to the movable rail U. The intermediate bent portion 73m may be fixed (e.g. welded) to the nut member 42 or may not be fixed.

The intermediate wall part 73 is joined (e.g. welded) to an inner face of one of the left and right side wall portions 22s of the lower half of the movable rail U. The support plate 70 is thereby fixed to the movable rail U, and the base end of each of the front and rear stopper wall parts 71 and 72 is fixed to the movable rail U (more specifically, the side wall portion 22s) via the intermediate wall part 73, that is, it is cantilever-supported.

The front and rear stopper wall parts 71 and 72 of the support plate 70 detachably abut against the stopper faces 62s of the front and rear bearing members 60 respectively, thus restricting the forward limit/rearward limit of the movable rail U. In addition, the support plate 70 may be omitted, and the nut member 42 may be made to abut directly against the stopper face 62s of each of the front and rear bearing members 60.

A reinforcing portion 22b is provided on the movable rail U, the upper half of each movable rail half body 22 in particular, at a position where at least part thereof overlaps the support plate 70 in the axial direction. The reinforcing portion 22b is formed by plastically deforming part of the upper half of the movable rail half body 22 into a rib shape protruding outward in the left-and-right direction. Due to the reinforcing portion 22b being specially provided, it becomes possible to reinforce effectively, by means of the reinforcing portion 22b, a region of the movable rail U where the burden is increased due to the support plate 70 being fixed.

One example of the power supply device E is now explained mainly by reference to FIGS. 1, 2, 4, and 6.

The power supply device E includes an electric wire 80 for power supply, a housing H for housing the electric wire 80, and a slider 50 that is linked to one (in the illustrated example the left side) of the left and right movable rails U and is capable of sliding within the fixed rail L on the same side. The electric wire 80 is, throughout substantially the entire length thereof, loosely inserted into a bellows-shaped protective tube 81 formed from a synthetic resin material and having flexibility, and due to the covering and protecting action of the protective tube 81 the electric wire 80 is protected from being forcibly bent.

Part of the electric wire 80, that is, a movable end portion 80a, which is drawn out from the housing H as described later and can slide within the fixed rail L, is embedded in and retained by the slider 50 together with a movable end part of the protective tube 81, which surrounds the movable end portion 80a.

In the present invention and the present specification, the 'electric wire' referred to may be a single line of lead wire or may be in a state called a wire harness that is formed by binding a plurality of lead wires, but in the illustrated example the wire harness is simply called an electric wire.

The housing H is formed into a box shape that extends linearly in a predetermined direction and is flat in the up-and-down direction so that it can be disposed without difficulty in a confined space immediately below the seat S, and a pair of the electric wires 80 each surrounded by the bellows-shaped protective tube 81 are housed in the interior of the housing H. End parts on the vehicle body side of the pair of electric wires 80 are made to converge together, and the converged portion is connected to a coupler 82 fixedly provided at an appropriate position of an outer face of the housing H. This coupler 82 is removably joined to a coupler 84 connected to an electric wire 83 extending from an electronic control device (not illustrated) on the vehicle body side. A base end part Ha of the housing H is detachably connected to a rear end part Lr of one of the left and right fixed rails L. The base end part Ha is provided with an opening facing the inner space of the fixed rail L, and this opening functions as a lead-out port for the pair of electric wires 80 each surrounded by the protective tube 81. Therefore, the pair of electric wires 80 housed within the housing H and each surrounded by the protective tube 81 are drawn out into the fixed rail L through the opening of the base end part Ha of the housing H and can follow sliding in the front-and-rear direction of the slider 50 and come into sliding contact with the interior of the fixed rail L (more specifically, the top of the travel guide face 12a).

The housing H of the present embodiment in particular is disposed so as to be inclined toward the seat middle side in the left-and-right direction in going toward the front end part Lf of the fixed rail L with respect to the fixed rail L when viewed from above. In accordance with this arrangement, the housing H can be contained in a compact manner in the front-and-rear direction in a dead space between the left and right fixed rails L and L immediately below the seat S. Moreover, due to the housing H being inclined with respect to the fixed rail L when viewed from above, compared with a case in which the housing H is provided along the fixed rail L, the curvature of the electric wire 80, which is drawn out from the opening in the base end part Ha of the housing H and turned back toward the fixed rail L side, can be made small, and the electric wire 80 can be smoothly bent without difficulty within the housing H, thus improving the durability of the electric wire 80.

One example of the slider 50 is now explained. The slider 50 has a slider base part 50B having a majority thereof disposed within the fixed rail L, and a slider extremity 50A connectedly provided integrally with an upper part of the slider base part 50B via a constriction portion 50m and protruding further upward than the fixed rail L, and is formed from a synthetic resin material. The slider base part 50B includes a pair of electric wire-retaining parts 52 and 53 arranged across a gap in the left-and-right direction within the fixed rail L and a linking part 51 providing an integral link between the electric wire-retaining parts 52 and 53.

The electric wire-retaining parts 52 and 53 are placed on and supported by the travel guide face 12a of the bottom wall part 12 of the fixed rail L so that they can slide in the front-and-rear direction. A tip end part of the bellows-shaped protective tube 81, which is drawn into the fixed rail L through the opening of the base end part Ha of the housing H, and part of the electric wire 80 extending out from the tip end part of the protective tube 81, that is, the movable end portion 80a, are integrally covered and retained by the electric wire-retaining parts 52 and 53. The movable end portion 80a of the electric wire 80 extends upward within the slider extremity 50A and is made to converge, and the converged portion is connected to a coupler 86 fixedly provided on the slider extremity 50A. This coupler 86 is removably joined to a coupler 88 connected to an electric wire 87 extending from the electrical component on the seat S side.

The linking part 51 has a top wall portion 51t that can cover the upper side of the threaded shaft 41 and the bearing member 60, and left and right side wall portions 51s extending vertically downward from left and right ends of the top wall portion 51t, and inner faces of the top wall portion 51t and the left and right side wall portions 51s form an interference-avoiding portion 50c having a squared U-shaped cross section for avoiding interference with the threaded shaft 41 and the bearing member 60. That is, a first recess portion 51h that is formed by recessing upward an inner face of the linking part 51 (that is, a face opposing the threaded shaft 41) is formed as the interference-avoiding portion 50c for avoiding interference with the threaded shaft 41 and the bearing member 60.

A wide space sandwiched by the first recess portion 51h (interference-avoiding portion 50c) and the second recess portion 12h formed by recessing downward the bottom wall part 12 of the fixed rail L so as to oppose the first recess portion 51h is ensured, the threaded shaft 41 passes longitudinally through this space, and the bearing member 60 can pass through relative thereto. That is, it becomes possible by means of the first and second recess portions 51h and 12h to ensure a sufficiently wide space for disposing the threaded shaft 41 and a peripheral component (e.g. the bearing member 60) and, moreover, a portion corresponding to the second recess portion 12h of the bottom wall part 12 of the fixed rail L is capable of exhibiting a reinforcing rib effect, thereby increasing the bending stiffness of the fixed rail L.

The slider 50 is disposed so that at least part of the electric wire-retaining parts 52 and 53 overlaps the threaded shaft 41 when the seat is viewed from the side. In accordance with this arrangement, due to the fixed rail L having both the slider 50 (in particular, the electric wire-retaining parts 52 and 53) and the threaded shaft 41 disposed in the interior thereof, it becomes possible to suppress any increase in the vertical dimension.

The slider 50 is detachably joined to the movable rail U via linking means, which is explained below. That is, the linking means includes an elastic latching claw 51a projectingly provided at the front end of the linking part 51 (more specifically, the side wall portion 51s) of the slider 50 and extending forward, and a latching hole 22h formed in the side wall portion 22s of the lower half of the movable rail half body 22 so as to correspond to the elastic latching claw 51a. A latching projection 51at is provided at the tip part of the latching claw 51a, and this latching projection 51at is disengageably latched with the latching hole 22h. Due to such latching, it is possible to detachably join the slider base part 50B to the lower half of the movable rail U while maintaining a state in which the slider extremity 50A is abutted against the rear end of the upper half of the movable rail U, thereby enabling the slider 50 to follow the movable rail U and move in the front-and-rear direction.

The linking means between the slider 50 and the movable rail U is not limited to the structure of the embodiment, and various types of linking means (e.g. joining by a bolt, joining by swaging, etc.) may be employed.

The fixed rail L is covered neatly by a floor carpet (not illustrated) that covers an upper face of the floor frame F. In this case, the floor carpet is appropriately provided with a slit that allows movement of the movable rail U and the slider 50 in the front-and-rear direction, that is, the upper half of the movable rail U, which is narrow in the left-and-right direction, and the constriction portion 50m of the slider 50 can move in the front-and-rear direction in the gap of the slit.

The operation of the first embodiment explained above is now explained. When, for example, an occupant operates an operating switch (not illustrated) on the door inner face so as to rotate the motor M forward or backward, the rotational power rotates the threaded shaft 41 forward or backward via the motor shaft 37, and the left or right transmission mechanism 30, the transmission shaft 36, and the joint J, and in operative connection therewith the nut member 42 (and therefore the movable rail U and consequently the seat S) slides forward or backward on the fixed rail L. Since this sliding is carried out via the roller 24, which rolls on the travel guide face 12a of the inner face of the fixed rail L, the sliding resistance can be made very small.

When the seat S attains a desired position in the front-and-rear direction, stopping operating the operating switch makes the motor M stop, thereby enabling the seat S to be adjusted to the desired position in the front-and-rear direction at any time. Control to energize the motor M may be automated by an electronic control device, thus carrying out automatic adjustment to a preset position in the front-and-rear direction.

While following the seat S sliding in the front-and-rear direction, the slider 50 slides in the front-and-rear direction within the fixed rail L, and part of the electric wire 80, which is drawn out from the housing H following the above, slides in the front-and-rear direction within the fixed rail L (more specifically, on the travel guide face 12a) together with the protective tube 81.

In the present embodiment, the drive unit Du, which includes the motor M outputting the driving force for driving the movable rail U (the seat S) in the front-and-rear direction and the gear box 31 of the transmission mechanism 30 for transmitting the output of the motor M to the threaded shaft 41, is mounted on the front end part Lf of the fixed rail L, and the power supply device E (e.g. the housing H, the slider 50, etc.) for supplying power to the electrical component on the seat S side is disposed closer to the rear end part Lr of the fixed rail L than the drive unit Du (e.g. the motor M, the gear box 31, the transmission mechanism 30). This enables interference between the drive unit Du (the motor M, the gear box 31, the transmission mechanism 30) and the power supply device E (the housing H, the slider 50) to be avoided without difficulty, thus enhancing the degree of freedom in the arrangement thereof. Moreover, transmission of vibration from the motor M and the transmission mechanism 30 to the seat S side can be suppressed effectively, thus improving the ride comfort of the seat S.

Furthermore, in the present embodiment, the drive device D has the motor M and the threaded shaft 41 as a transmission member disposed so as to pass longitudinally through the interior of the fixed rail L, whereas the power supply device E supplying power to the electrical component on the seat S side includes the slider 50 linked to the movable rail U and being capable of sliding within the fixed rail L, the movable end portion 80a of the electric wire 80 for power supply, which is capable of sliding within the fixed rail L, is retained on the slider 50, and the slider 50 has the interference-avoiding portion 50c for avoiding interference with the threaded shaft 41 within the fixed rail L.

This enables the bearing member 60 or the threaded shaft 41, which passes longitudinally through the interior of the fixed rail L, of the drive device D and the slider 50 for retaining the electric wire, which slides within the fixed rail L, to be arranged in proximity to each other within the fixed rail L while avoiding interference therebetween, thus contributing to simplification and a reduction in the size of the overall rail structure. Even when the threaded shaft 41 passes longitudinally through the interior of the fixed rail L, since it is not necessary to specially provide slide-supporting means (e.g. a power supply rail of Patent Document 1) for the slider 50 outside the fixed rail L, such slide-supporting means will not be superimposed on the support frames 7 to 9 in the up-and-down direction, and the degree of freedom in design of the structure for mounting the fixed rail L on the floor frame F is enhanced.

Moreover, the slider 50 of the present embodiment has the pair of electric wire-retaining parts 52 and 53 arranged across a gap in the left-and-right direction within the fixed rail L, and the linking part 51 providing a link between the electric wire-retaining parts 52 and 53, and the interference-avoiding portion 50c is provided on a part, opposing the threaded shaft 41, of the linking part 51. Since this enables the interference-avoiding portion 50c to be formed compactly without difficulty by utilizing the linking part 51 linking the left and right electric wire-retaining parts 52 and 53, it is possible to suppress effectively any increase in the lateral dimension of the fixed rail L due to the threaded shaft 41, the bearing member 60, and the slider 50 being disposed in the interior thereof.

Furthermore, the linking part 51 has the top wall portion 51t covering the upper side of the threaded shaft 41 and the left and right side wall portions 51s extending vertically downward from the left and right ends of the top wall portion 51t, and the inner faces of the top wall portion 51t and left and right side wall portions 51s form the interference-avoiding portion 50c having a squared U-shaped cross section. In this case, due to the left and right side wall portions 51s of the interference-avoiding portion 50c each being a vertical wall, it is possible to suppress any increase in the width in the left-and-right direction of the interference-avoiding portion 50c as much as possible, thus advantageously reducing the dimension in the left-and-right direction of the linking part 51, and consequently the slider 50.

Moreover, in the present embodiment, the bearing member 60 fixed to the fixed rail L and supporting the threaded shaft 41 includes the plurality of standing walls 61 and 62 each having the through holes 61a and 62a, through which the threaded shaft 41 is fitted, and being arranged across a gap in the front-and-rear direction, and the linking wall part 63 providing an integral connection between the extremities of the standing walls 61 and 62. This enables the bearing member 60 to be stably supported on the fixed rail L with a long support span in the front-and-rear direction even without it being formed so that it is thick in the front-and-rear direction.

Moreover, since the linking wall part 63 joining the plurality of standing walls 61 and 62 to each other is formed so that the cross-sectional shape transecting the threaded shaft 41 is an arch shape (see FIG. 5) or a bent shape (see FIG. 7) in which at least a middle part protrudes toward the side away from the threaded shaft 41 or the side close thereto so that it becomes an apex part, the bending stiffness of the linking wall part 63 itself is enhanced effectively. As a result, the bearing member 60 can ensure a sufficient support rigidity toward the threaded shaft 41 while lightening the weight of the bearing member 60.

Moreover, since among the plurality of standing walls 61 and 62, the threaded shaft 41 is fitted and supported in the through hole 61a of the first standing wall 61 without play, and the threaded shaft 41 is fitted in the through hole 62a of the second standing wall 62 with play, even when there are a plurality of the standing walls 61 and 62 (and consequently the through holes 61a, 62a), the through hole 61a (bearing hole) for supporting the threaded shaft 41 without play may be formed only in the standing wall(s) 61 which is part of the standing walls, and this eliminates the necessity for strict coaxial precision between the plurality of through holes 61a and 62a, thus cutting the machining cost.

Furthermore, the bearing member 60 is formed from a bent band plate material, and the threaded shaft 41 is fitted and supported in the through hole 61a of the (first) standing wall(s) 61, which is said part of the standing walls, via the bearing bush 65. Because of this, even if the standing wall 61 having the through hole 61a as the bearing hole has a plate shape and is thin, any decrease in the support rigidity toward the threaded shaft 41 can be minimized.

Moreover, since the first standing wall(s) 61 is disposed further outside in the axial direction of the threaded shaft 41 than the second standing wall(s) 62, and the second standing wall(s) 62 has the stopper face 62s, which engages directly or indirectly (that is, via the support plate 70) with the nut member 42 and restricts the forward limit or rearward limit of the movable rail U, the bearing member 60 supporting the threaded shaft 41 also functions as a stopper member restricting the forward limit or rearward limit of the movable rail U, thus accordingly simplifying the structure. Furthermore, since the functions are divided such that, among the plurality of standing walls 61 and 62 of the bearing member 60, the standing wall(s) 61 on the outer side in the axial direction acts as a bearing wall and the standing wall(s) 62 on the inner side in the axial direction acts as stopper means, the burden on each of the standing walls 61 and 62 can be alleviated, thus further lightening the weight.

The extending walls 61w and 62w extending toward the sides opposite from each other in the front-and-rear direction are connectedly provided integrally with the base ends of the first and second standing walls 61 and 62 arranged across a gap in the front-and-rear direction, and the bearing member 60 is joined to the fixed rail L via the extending walls 61w and 62w. This enables the support span of the fixed rail L toward the bearing member 60 to be increased due to the extension walls being specially provided, and the support rigidity toward the bearing member 60 can be further enhanced.

Furthermore, in the present embodiment, the plate-shaped stopper wall parts 71 and 72 through which the threaded shaft 41 extends at a position spaced from the nut member 42 in at least one of the forward and backward directions (both directions in the embodiment) are fixedly supported on the movable rail U in a cantilever manner, and due to the stopper wall parts 71 and 72 detachably abutting against the stopper face 62s of the bearing member 60 the forward limit and the rearward limit for the movable rail U are restricted. Since the plate-shaped stopper wall parts 71 and 72 thereby undergo some elastic deformation when they abut against the stopper face 62s, compared with a structure in which the nut member 42 directly engages with the stopper face 62s the effect in absorbing impact at the time of engagement is enhanced.

Moreover, in the present embodiment, the pair of front and rear bearing members 60 are fixed to the fixed rail L across a gap in the front-and-rear direction so as to sandwich the nut member 42 therebetween, the front and rear stopper wall parts 71 and 72, through which the threaded shaft 41 extends at positions spaced from the nut member 42 in one and the other of the forward and backward directions, are fixed to the movable rail U, and the pair of front and rear stopper wall parts 71 and 72 detachably abut against the stopper faces 62s of the pair of front and rear bearing members 60, thus restricting the forward limit and the rearward limit for the movable rail U. Therefore, due to the pair of front and rear stopper wall parts 71 and 72, through which the threaded shaft 41 extends at positions spaced from the nut member 42 in one and the other of the forward and backward directions, being specially provided a region of an intermediate part of the threaded shaft 41 that becomes free in the center run-out direction can be decreased, thus having an effect in suppressing the center run-out of the threaded shaft 41.

Furthermore, the support plate 70 of the present embodiment has the front and rear stopper wall parts 71 and 72 and the intermediate wall part 73 having opposite ends connected to the stopper wall parts 71 and 72, extending in the front-and-rear direction, and being fixed (e.g. welded) to the movable rail U, and is disposed between the front and rear bearing members 60 within the movable rail U, and the intermediate wall part 73 has the intermediate bent portion 73m that clasps the nut member 42 fixed to the movable rail U. This enables the single support plate 70, which has the front and rear stopper wall parts 71 and 72 and exhibits a stopper function in both forward and backward directions, to be formed easily with low cost by press forming a band plate material. Moreover, the support plate 70 can enhance the support strength for the nut member 42 by utilizing the intermediate bent portion 73m.

Figure 8:
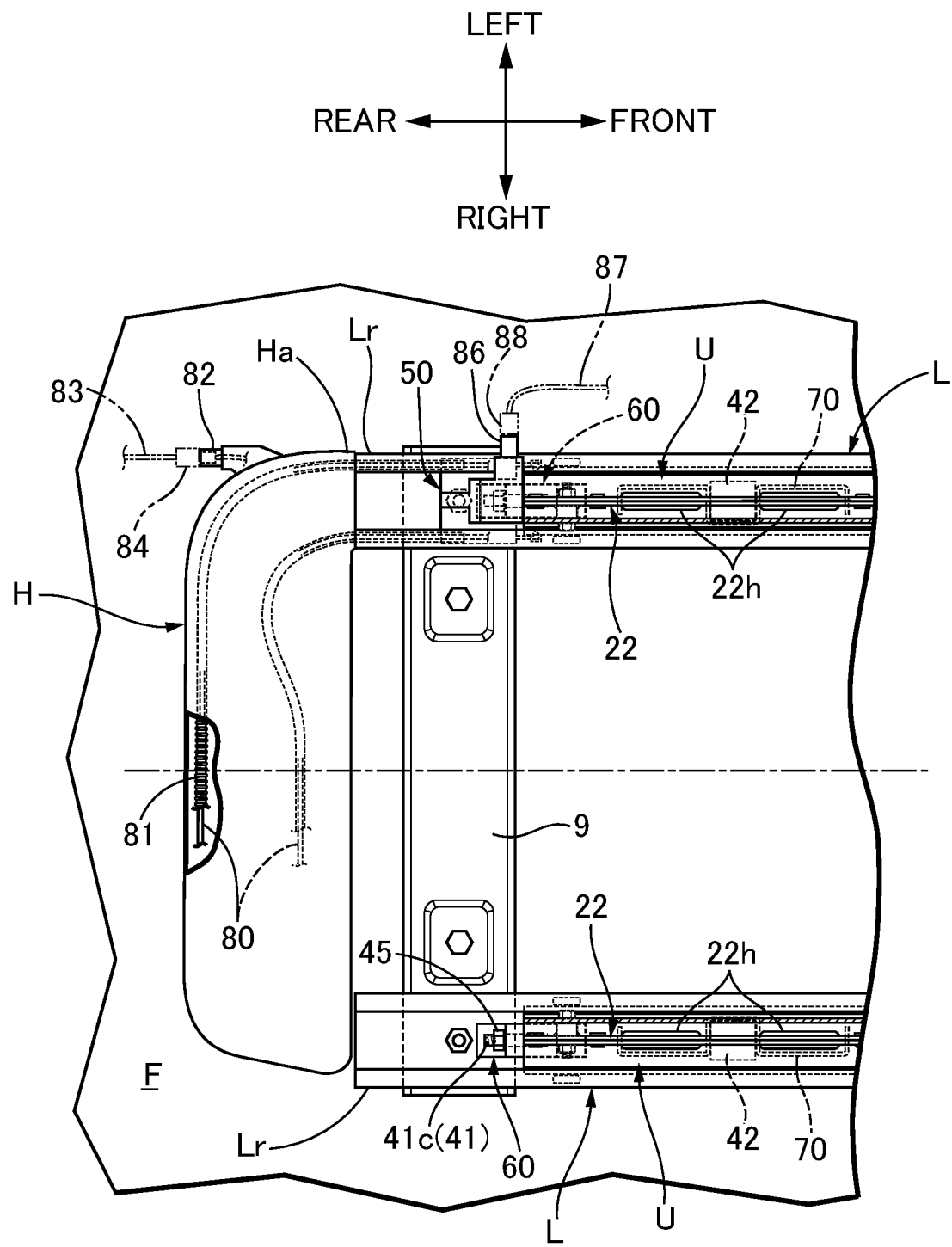
FIG. 8 is a plan view showing an essential part of an adjusting device of front and rear positions related to a second embodiment of the present invention (view corresponding to FIG. 2)

FIG. 8 shows a second embodiment of the present invention. That is, in the first embodiment the housing H is inclined toward the middle side in the seat left-and-right direction in going to the front end part Lf of the fixed rail L with respect to the fixed rail L when viewed from above, but in the second embodiment the housing H is disposed so as to extend toward the middle side in the seat left-and-right direction while being substantially orthogonal to the fixed rail L when viewed from above. The arrangement is otherwise the same as that of the first embodiment, and constituent elements are denoted by the same reference numerals and symbols as those of the corresponding constituent elements of the first embodiment, further explanation being omitted.

Therefore, in the second embodiment, basically the same effects as those of the first embodiment can also be exhibited and, furthermore, in the second embodiment due to the housing H being substantially orthogonal to the fixed rail L, there is no possibility of the housing H and a portion (e.g. the support frames 7 to 9) of the fixed rail L fixed to the floor frame F being superimposed on one another in the up-anddown direction, thus further improving the degree of freedom in design. Furthermore, due to the housing H being substantially orthogonal to the fixed rail L when viewed from above, compared with a case in which the housing H is provided along the fixed rail L, the curvature of the electric wire 80 that is drawn out of the housing H and curved toward the fixed rail L side can be further reduced, and there is the advantage that the electric wire 80 can be more smoothly bent, etc.

Figure 9:
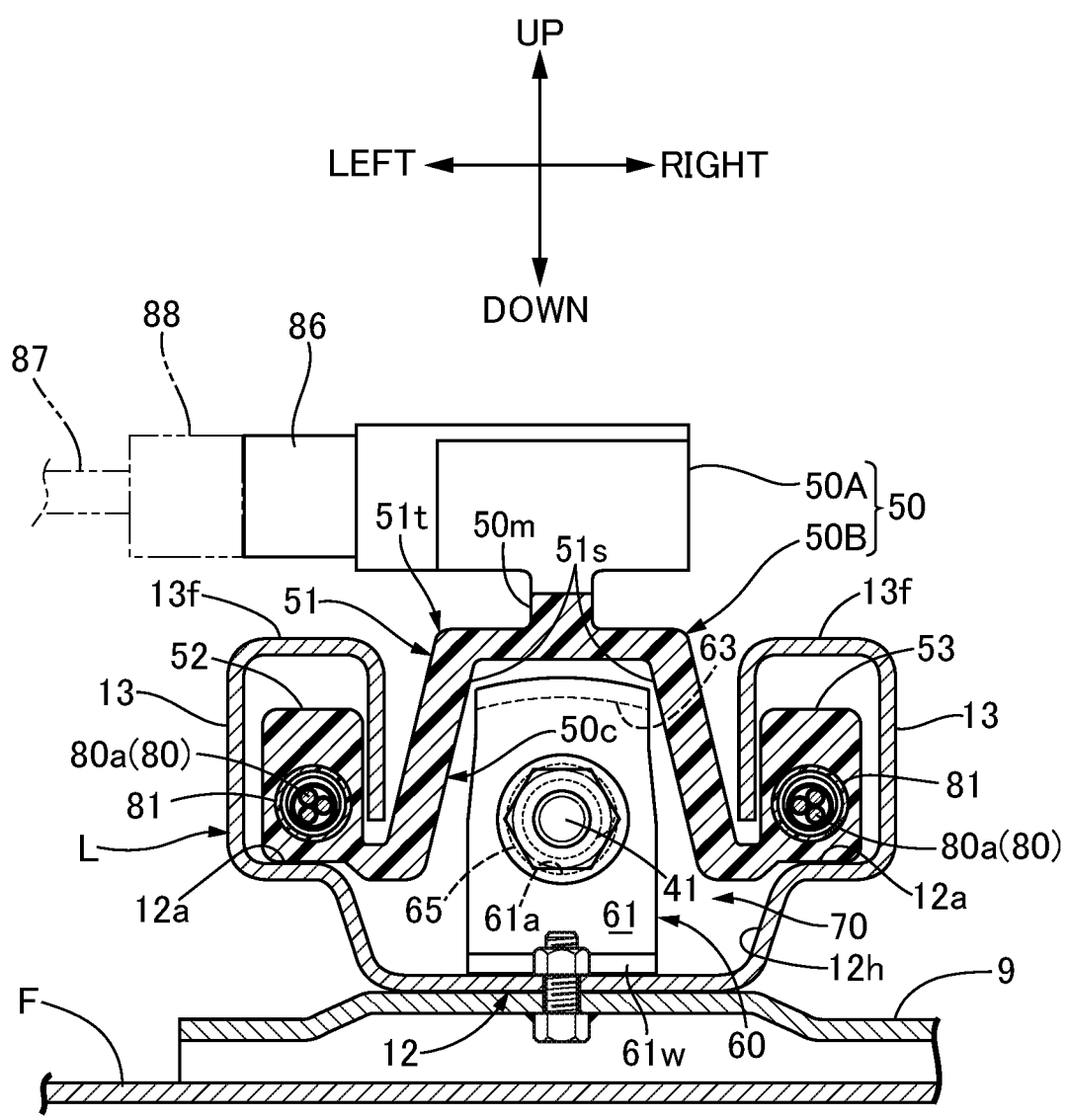
FIG. 9 is a sectional view, corresponding to FIG. 6, showing an essential part of an adjusting device of front and rear positions related to a third embodiment of the present invention.

FIG. 9 shows a third embodiment of the present invention. In this embodiment, the linking part 51 of the slider 50 has a top wall portion 51*t* that covers the upper side of the threaded shaft 41, and left and right side wall portions 51*s* that extend obliquely downward from left and right ends of the top wall portion 51*t* so as to spread out in going toward the tip, inner faces of the top wall portion 51*t* and the left and right side wall portions 51*s* forming an interference-avoiding portion 50*c* having a peak-shaped cross section. The arrangement is otherwise the same as that of the first embodiment, and constituent elements are denoted by the same reference numerals and symbols as those of the corresponding constituent elements of the first embodiment, further explanation being omitted.

Therefore, in the third embodiment, basically the same effects as those of the first embodiment can also be exhibited and, moreover, in the third embodiment due to the slider 50 having the lower half of the linking part 51 spreading out in going toward the tip and downward interference with the threaded shaft 41 can be avoided without difficulty. Furthermore, since the top wall portion 51*t* of the linking part 51 has a relatively small width, a portion of the slider 50 that is exposed and extended from the upper end of the fixed rail L can be made small in the left-and-right direction, thus avoiding effectively interference with other objects.

Figure 10:
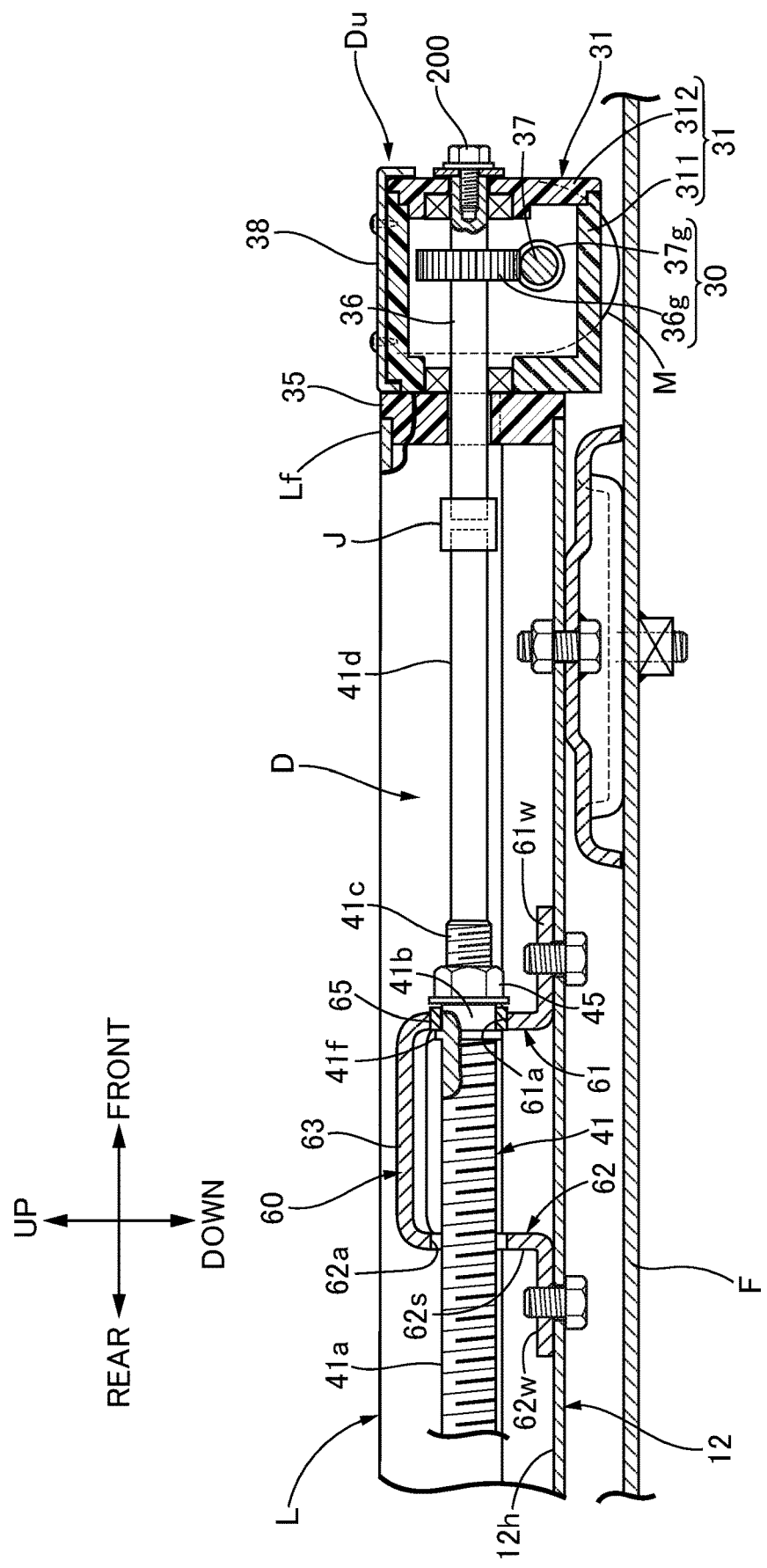
FIG. 10 is a sectional view, corresponding to FIG. 3, showing an essential part of an adjusting device of front and rear positions related to a fourth embodiment of the present invention.

FIG. 10 shows a fourth embodiment of the present invention. In the first embodiment, the gear box 31 (drive unit Du) can be detachably latched with the fixed rail L via the plate spring member 90, but in the fourth embodiment the outer end of the transmission shaft 36 joined to the extending shaft portion 41*d* of the threaded shaft 41 via the joint J is made to project outward of an outside wall (a lid 312) of the gear box 31, and engaging a head part of a bolt 200, screwed into the projecting end face from the outside, with the projecting end face fixes the gear box 31 to the front end part Lf of the fixed rail L. The arrangement is otherwise the same as that of the first embodiment, and constituent elements are denoted by the same reference numerals and symbols as those of the corresponding constituent elements of the first embodiment, further explanation being omitted.

Therefore, in the fourth embodiment, basically the same effects as those of the first embodiment can also be exhibited and, moreover, in the fourth embodiment since the transmission shaft 36 can be used as retaining means for the gear box 31 in cooperation with the bolt 200, the structure for securing the gear box 31 is accordingly simplified. As an modified example of the fourth embodiment, a structure in which for example the extending shaft portion 41*d* of the threaded shaft 41 and the transmission shaft 36 are formed as a unit can be implemented.

Figure 11:
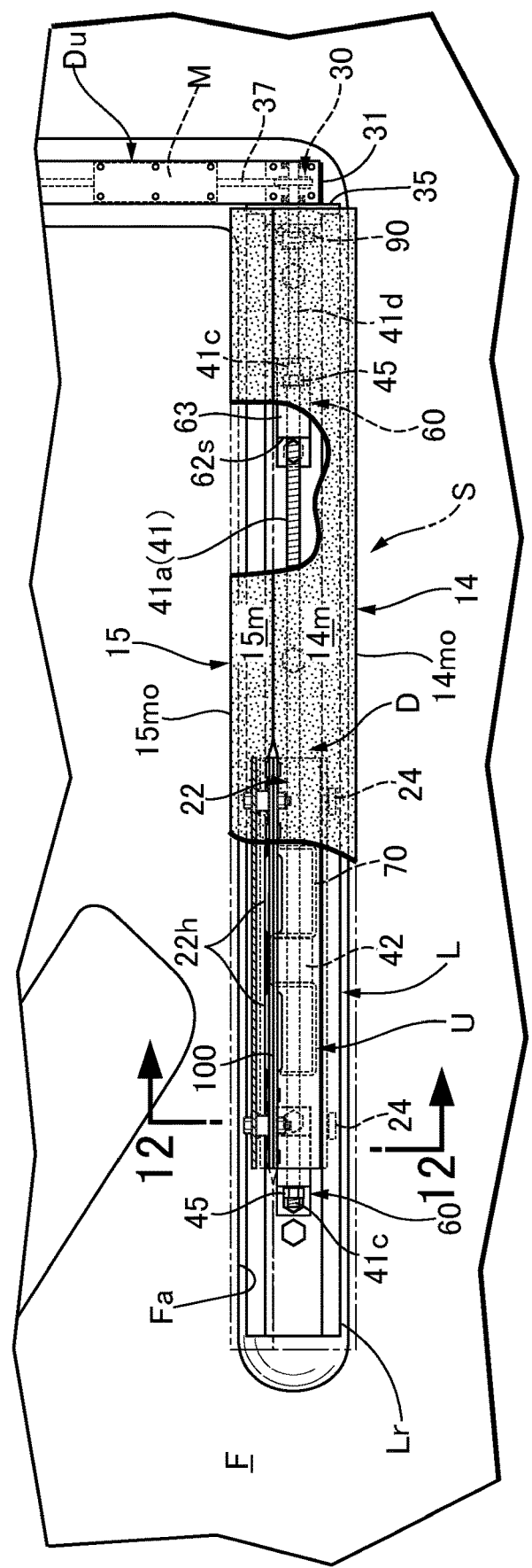
FIG. 11 is a plan view, corresponding to FIG. 2, showing an essential part of an adjusting device of front and rear positions related to a fifth embodiment of the present invention.
Figure 12:
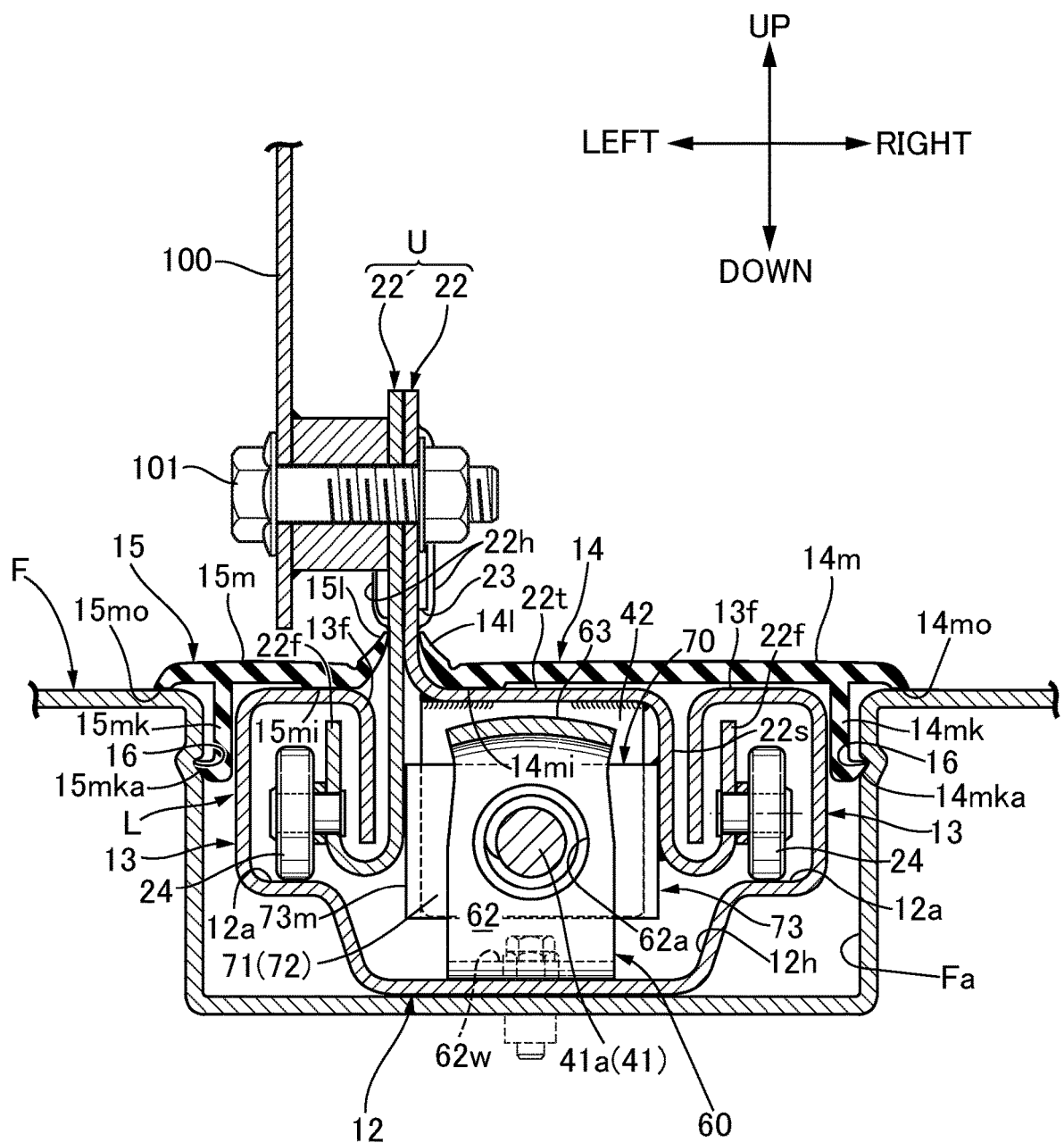
FIG. 12 is an enlarged sectional view along line 12-12 in FIG. 11.

FIGS. 11 and 12 show a fifth embodiment of the present invention. In the first embodiment, the opening at the upper end of the fixed rail L is covered only by the floor carpet and not by a molding, but in the fifth embodiment the opening at the upper end of at least one (the right one in the illustrated example) of the right and left fixed rails L is formed so as to be blocked by a pair of left and right moldings 14 and 15. The upper side of the moldings 14 and 15 is covered as necessary by a floor carpet (not illustrated).

A movable rail U of the fifth embodiment is formed so that a pair of movable rail halves 22 and 22' are non-symmetric in the left and right direction, and the upper half of the movable rail U and a part thereof joined to a hanging wall part 100 of a seat base plate are disposed offset toward the seat interior (leftward in FIG. 12). That is, the upper half and a majority of the lower half of the second movable rail half body 22', which is on the seat interior side, form a continuous vertical wall, whereas the lower half of the first movable rail half body 22, which is on the seat exterior side (rightward in FIG. 12), includes a top wall portion 22*t* that is wide in the left-and-right direction and a side wall portion 22*s* that descends vertically from the outer end of the top wall portion 22*t*, and not only the nut 45 and the support plate 70 but also part of the bearing member 60 and the threaded shaft 41 are covered by the wide top wall portion 22*t*. Due to such offset disposition toward the seat interior side, the upper half of the movable rail U and the part thereof joined to the hanging wall part 100 of the seat base plate can be positioned as close to the seat interior side as possible, and there is therefore the advantage that they are hard to see from the seat exterior side.

For the purpose of receiving the fixed rail L a groove-shaped mounting recess Fa extending in the front-and-rear direction is formed in the floor frame F of the vehicle body, and the bottom wall part 12 of the fixed rail L is joined (e.g. bolted) to a bottom part of the mounting recess Fa. A recessed or protruding (recessed in the illustrated example) latching part 16 extending in the front-and-rear direction is formed on each of left and right opening edge parts of the mounting recess Fa, and the pair of left and right first and second moldings 14 and 15 are latched with the latching parts 16, the opening at the upper end of the fixed rail L being covered by mutual cooperation between the first and second moldings 14 and 15.

The moldings 14 and 15 are each formed integrally and connectedly from a molding main body 14*m*, 15*m* that is formed into a strip shape and extends over the entire length of the fixed rail L in a substantially horizontal attitude, and a lip portion 14*l*, 15*l* that is connectedly provided with the inner edge of the molding main body 14*m*, 15*m* and is slidably and resiliently in contact under pressure with the upper half of the corresponding movable rail half 22. The lip portions 14*l* and 5*l* may be formed as a separate material from that of the molding main body 14*m*, 15*m* and joined to the molding main body 14*m*, 15*m* afterward or may be molded integrally with the molding main body 14*m*, 15*m* from an elastic material. Furthermore, a face of the lip portion 14*l*, 15*l* that is in sliding contact with the movable rail half body 22 may be coated with a protective film in order to reduce sliding resistance as necessary.

In particular, the molding main body 14*m* of the first molding 14 on the seat exterior side is formed so as to be wide in the left and right direction so that it can cover the top wall portion 22*t* on the lower half of the movable rail half body 22 on the same side and the flange portion 13*f* at the upper end on the same side of the fixed rail L. A downward-facing first engagement projection portion 14*mo* is provided along the outer edge part of the molding main body 14*m*, the first engagement projection portion 14*mo* engaging with and being in pressure contact with an upper face of the floor frame F on the outer side of the mounting recess Fa. A downward-facing second engagement projection portion 14*mi* is provided along the inner edge part of the molding main body 14*m*, the second engagement projection portion 14*mi* slidably engaging with and being in pressure contact with an upper face of the top wall portion 22*t* of the first movable rail half body 22. At least one (in this embodiment a plurality at intervals in the front-and-rear direction) downward-facing latching piece 14*mk* is projectingly provided integrally with a lower face of the molding main body 14*m*, the latching piece 14*mk* projecting into a gap between an outside face of the fixed rail L and an inside face of the mounting recess Fa, and a latching claw portion 14*mka* provided at the tip part of the latching piece 14*mk* detachably latching with the latching part 16 on the inside face of the mounting recess Fa.

On the other hand, the molding main body 15*m* of the second molding 15 on the seat interior side is formed so as to be relatively narrow in the left and right direction, the molding main body 15*m* mainly covering the flange portion 13*f* at the upper end on the same side of the fixed rail L. A downward-facing first engagement projection portion 15*mo* is provided along the outer edge part of the molding main body 15*m*, the first engagement projection portion 15*mo* engaging with and being in pressure contact with an upper face of the floor frame F on the outer side of the mounting recess Fa. A downward-facing second engagement projection portion 15*mi* is provided along the inner edge part of the molding main body 15*m*, the second engagement projection portion 15*mi* engaging with and being in pressure contact with an upper face of the flange portion 13*f* at the upper end on the same side of the fixed rail L. At least one (in this embodiment a plurality at intervals in the front-and-rear direction) downward-facing latching piece 15*mk* is projectingly provided integrally with a lower face of the molding main body 15*m*, the latching piece 15*mk* projecting into a gap between the outside face of the fixed rail L and the inside face of the mounting recess Fa, and a latching claw portion 15*mka* provided at the tip part of the latching piece 15*mk* detachably latching with the latching part 16 on the inside face of the mounting recess Fa.

In this way, the first molding 14 is latched with and fixed to the mounting recess Fa while making the lip portion 14*l* be in pressure contact with the upper half of the first movable rail half body 22 by resiliently latching the latching piece 14*mk* with the latching part 16 in a state in which the first and second engagement projection portions 14*mo* and 14*mi* are abutted against the upper faces of the floor frame F and the top wall portion 22*t* respectively. The second molding 15 is latched with and fixed to the mounting recess Fa while making the lip portion 15*l* be in pressure contact with the upper half of the second movable rail half body 22' by resiliently latching the latching piece 15*mk* with the latching part 16 in a state in which the first and second engagement projection portions 15*mo* and 15*mi* are abutted against the upper faces of the floor frame F and the fixed rail L respectively.

In the above latched and fixed state, the first and second moldings 14 and 15 can cover in cooperation with each other (mainly the first molding 14) the opening at the upper end of the fixed rail L (and consequently gaps between the threaded shaft 41, the bearing member 60, the slider 50, the fixed rail L, and the upper halves of the first and second movable rail haves 22 and 22') and can cover a gap between the fixed rail L and the mounting recess Fa. This enables dirt, dust, and other foreign matter to be prevented effectively from adhering to components such as the threaded shaft 41, the bearing member 60, and the slider 50 within the fixed rail L or engagement parts between the components, thereby neatly hiding the inside of the fixed rail L and enhancing the marketability.

The shape of the lip portions 14*l* and 15*l* of the first and second moldings 14 and 15 may be set so that the lip portions 14*l* and 15*l* move toward each other by virtue of self resilience and are in direct contact with each other in a region where the lip portions 14*l* and 15*l* do not oppose the upper half of the movable rail U or so that they are not in contact but the gap therebetween is very small.

The arrangement is otherwise the same as that of the first embodiment, and constituent elements are denoted by the same reference numerals and symbols as those of the corresponding constituent elements of the first embodiment, further explanation being omitted.

Therefore, in the fifth embodiment, basically the same effects as those of the first embodiment can also be exhibited, but in the fifth embodiment due to the first and second moldings 14 and 15 being specially provided an effect in covering the opening at the upper end of the fixed rail L is further exhibited.

In the fifth embodiment, the molding structure covering the opening at the upper end of the fixed rail L is provided on one (the right one in the illustrated example) of the left and right fixed rails L, but the same molding structure may be provided on the other (the left one in the illustrated example) of the left and right fixed rails L. In this case, when the molding structure of the fifth embodiment is applied to one in which the slider 50 retaining the power supply electric wire 80 is slidably provided within the fixed rail L as for the fixed rail L on the left side in the first embodiment in particular, the lip portions 14*l* and 15*l* of the first and second moldings 14 and 15 are made to be in slidable pressure contact not only with the upper half of the movable rail U but also with the inner face of the constriction portion 50*m* of the slider 50. In a case in which as for the movable rail U of the fifth embodiment the upper halves of the movable rail halves 22 and 22' are disposed offset toward the seat interior side, it is desirable for the constriction portion 50*m* of the slider 50 to also be disposed offset toward the seat interior side.

Embodiments of the present invention are explained above, but the present invention is not limited to the above-mentioned embodiments and may be modified in a variety of ways as long as the modifications do not depart from the gist of the present invention.

For example, in the embodiments, the automobile seat S is illustrated as a seat, but the present invention can be applied to a seat that is used in a vehicle (e.g. a railway vehicle) other than an automobile, a seat used in a vessel (e.g. a ship, an airplane) other than the vehicle, or a seat used in one other than a vessel. When it is used as an automobile seat, the seat may be a front seat or a rear seat.

In the embodiment, the power supply electric wire 80 (wire harness) is protected by being inserted into the bellows-shaped protective tube 81, but the protective tube 81 may have at least flexibility and have strength that can protect the electric wire 80 and may not always be formed into a bellows shape. Alternatively, another embodiment in which the protective tube 81 is omitted is also possible.

Furthermore, in the embodiments the threaded shaft 41 is rotatably supported on the fixed rail L on the floor side via the bearing member 60, whereas the nut member 42 screwed around the threaded shaft 41 is fixed to the movable rail U on the seat side, and the motor M and the transmission mechanism 30 for rotating the threaded shaft 41 are mounted on the fixed rail L (on the vehicle body side). However, either one of the threaded shaft 41 and the nut member 42 may be on the rotation side or the fixed side, for example, the threaded shaft 41 may be fixedly supported on the fixed rail L via the bearing member 60 whereas the nut member 42 may be rotatably supported on the movable rail U and the motor M and the transmission mechanism 30 for rotating the nut member 42 may be mounted on the seat S side.

Moreover, the vertical positional relationship between the threaded shaft 41 and the nut member 42 is not limited to that in the embodiments, and for example the threaded shaft 41 may be rotatably supported on the movable rail U on the upper side via a bearing member whereas the nut member 42 may be fixed to the fixed rail L on the lower side and a motor and a transmission mechanism for driving the threaded shaft 41 may be mounted on the seat side. In this case also, the arrangement for the rotation side and the fixed side may be reversed, and for example the threaded shaft 41 may be fixed and supported on the movable rail U via a bearing member whereas the nut member 42 may be rotatably supported on the fixed rail L and a motor and a transmission mechanism for rotating the nut member 42 may be mounted on the vehicle body side.

The invention claimed is:

1. An adjusting device of front and rear positions of a seat, the device comprising a fixed rail that is fixed to a floor and extends in a front-and-rear direction, a seat support body that is fixed to the seat and supported on the fixed rail so that the seat support body is slideable in the front-and-rear direction, a drive device that drives the seat support body in the front-and-rear direction with respect to the fixed rail, and a power supply device that supplies power to an electrical component attached to the seat, wherein:
    the drive device has a motor and a transmission member that is disposed so as to pass longitudinally through an interior of the fixed rail and is involved in transmission of driving force from the motor to the seat support body,
    the power supply device includes a housing that houses an electric wire for power supply, and a slider that is linked to the seat support body and is slideable within the fixed rail, the electric wire being drawn out from the housing and retained by the slider so that the electric wire is slideable within the fixed rail, and
    the slider has an interference-avoiding portion that avoids interference with the transmission member within the fixed rail,
    the slider has a pair of electric wire-retaining parts that are arranged across a gap in a left- and-right direction within the fixed rail and a linking part that provides a link between the electric wire-retaining parts, and
    the interference-avoiding portion is provided in a part, opposing the transmission member, of the linking part.

2. The adjusting device of front and rear positions of a seat according to claim 1, wherein the slider is disposed so that at least part of each of the electric wire-retaining parts overlaps the transmission member when the seat is viewed from a side.

3. The adjusting device of front and rear positions of a seat according to claim 1, wherein the linking part has a top wall portion that covers an upper side of the transmission member and left and right side wall portions that extend vertically downward from left and right ends of the top wall portion, and the interference-avoiding portion, which has a squared U-shaped cross section, is formed from an inner face of the top wall portion and the left and right side wall portions.

4. The adjusting device of front and rear positions of a seat according to claim 1, wherein the linking part has a top wall portion that covers an upper side of the transmission member and left and right side wall portions that extend obliquely downward from left and right ends of the top wall portion so as to widen in going toward tips of the side wall portions, respectively, and the interference-avoiding portion, which has a peak-shaped cross section, is formed from an inner face of each of the top wall portion and the left and right side wall portions.

5. The adjusting device of front and rear positions of a seat according to claim 1, wherein a first recess portion, which is formed in the linking part so that an inner face thereof is recessed upward, forms the interference-avoiding portion, a bottom wall part of the fixed rail has a second recess portion that is formed by recessing a lower part of the bottom wall part at a position opposing the interference-avoiding portion, and the transmission member extends through a space sandwiched between the first and second recess portions.

6. The adjusting device of front and rear positions of a seat according to claim 1, wherein a threaded shaft forming the transmission member is rotatably supported on the fixed rail in a state in which movement in an axial direction is restricted, a nut member screwed around the threaded shaft being fixed to the seat support body,
    the motor and a transmission case of a transmission mechanism that transmits an output of the motor to the threaded shaft are mounted on one end part in a front-and-rear direction of the fixed rail, and
    the power supply device is disposed closer to another end part in the front-and-rear direction of the fixed rail than to the motor and the transmission case.

7. The adjusting device of front and rear positions of a seat according to claim 6, wherein the housing is disposed so as to be inclined toward a middle in a left-and-right direction of the seat with respect to the fixed rail in going toward the one end part of the fixed rail when viewed from above, and a base end part, from which the electric wire is drawn, of the housing is connected to the other end part of the fixed rail.

8. The adjusting device of front and rear positions of a seat according to claim 6, wherein the housing is disposed so as to extend toward a middle in a left- and-right direction of the seat while being substantially orthogonal to the fixed rail when viewed from above, and a base end part, from which the electric wire is drawn, of the housing is connected to the other end part of the fixed rail.

9. The adjusting device of front and rear positions of a seat according to claim 6, wherein a drive unit that includes the motor and the transmission case is disengageably latched with the one end part of the fixed rail via a plate spring member.

10. An adjusting device of front and rear positions of a seat, the device comprising a fixed rail that is fixed to a floor and extends in a front-and-rear direction, a seat support body that is fixed to the seat and supported on the fixed rail so that the seat support body is slideable in the front-and-rear direction, a drive device that drives the seat support body in the front-and-rear direction with respect to the fixed rail, and a power supply device that supplies power to an electrical component attached to the seat, wherein:
    the drive device has a motor and a transmission member that is disposed so as to pass longitudinally through an interior of the fixed rail and is involved in transmission of driving force from the motor to the seat support body,
    the power supply device includes a housing that houses an electric wire for power supply, and a slider that is linked to the seat support body and is slideable within the fixed rail, the electric wire being drawn out from the housing and retained by the slider so that the electric wire is slideable within the fixed rail, the slider has an interference-avoiding portion that avoids interference with the transmission member within the fixed rail, a threaded shaft forming the transmission member is rotatably supported on the fixed rail in a state in which movement in an axial direction is restricted, a nut member screwed around the threaded shaft being fixed to the seat support body, the motor and a transmission case of a transmission mechanism that transmits an output of the motor to the threaded shaft are mounted on one end part in a front-and-rear direction of the fixed rail, the power supply device is disposed closer to another end part in the front-and-rear direction of the fixed rail than to the motor and the transmission case, and the housing is disposed so as to be inclined toward a middle in a left-and-right direction of the seat with respect to the fixed rail in going toward the one end part of the fixed rail when viewed from above, and a base end part, from which the electric wire is drawn, of the housing is connected to the other end part of the fixed rail.

11. The adjusting device of front and rear positions of a seat according to claim 10, wherein the slider is disposed so that at least part of each of the electric wire-retaining parts overlaps the transmission member when the seat is viewed from a side.

12. The adjusting device of front and rear positions of a seat according to claim 10, wherein the linking part has a top wall portion that covers an upper side of the transmission member and left and right side wall portions that extend vertically downward from left and right ends of the top wall portion, and the interference-avoiding portion, which has a squared U-shaped cross section, is formed from an inner face of the top wall portion and the left and right side wall portions.

13. The adjusting device of front and rear positions of a seat according to claim 10, wherein the linking part has a top wall portion that covers an upper side of the transmission member and left and right side wall portions that extend obliquely downward from left and right ends of the top wall portion so as to widen in going toward tips of the side wall portions, respectively, and the interference-avoiding portion, which has a peak-shaped cross section, is formed from an inner face of each of the top wall portion and the left and right side wall portions.

14. The adjusting device of front and rear positions of a seat according to claim 10, wherein a first recess portion, which is formed in the linking part so that an inner face thereof is recessed upward, forms the interference-avoiding portion, a bottom wall part of the fixed rail has a second recess portion that is formed by recessing a lower part of the bottom wall part at a position opposing the interference-avoiding portion, and the transmission member extends through a space sandwiched between the first and second recess portions.

15. The adjusting device of front and rear positions of a seat according to claim 10, wherein the housing is disposed so as to extend toward a middle in a left-and-right direction of the seat while being substantially orthogonal to the fixed rail when viewed from above, and a base end part, from which the electric wire is drawn, of the housing is connected to the other end part of the fixed rail.

16. The adjusting device of front and rear positions of a seat according to claim 10, wherein a drive unit that includes the motor and the transmission case is disengageably latched with the one end part of the fixed rail via a plate spring member.

17. A process for producing an adjusting device of front and rear positions of a seat, wherein the device comprises a fixed rail that is fixed to a floor and extends in a front-and-rear direction, a seat support body that is fixed to the seat and supported on the fixed rail so that the seat support body is slideable in the front-and-rear direction, a drive device that drives the seat support body in the front-and-rear direction with respect to the fixed rail, and a power supply device that supplies power to an electrical component attached to the seat, the process comprising the steps of:

preparing the drive device which has a motor and a transmission member that is disposed so as to pass longitudinally through an interior of the fixed rail and is involved in transmission of driving force from the motor to the seat support body, preparing the power supply device which includes a housing that houses an electric wire for power supply, and a slider that is linked to the seat support body and is slideable within the fixed rail, the electric wire being drawn out from the housing and retained by the slider so that the electric wire is slideable within the fixed rail, preparing the slider which has an interference-avoiding portion that avoids interference with the transmission member within the fixed rail; and disposing the slider so that at least part of each of the electric wire-retaining parts overlaps the transmission member when the seat is viewed from a side.

18. The process for producing an adjusting device of front and rear positions of a seat according to claim 17, further comprising the step of forming the linking part to have a top wall portion that covers an upper side of the transmission member and left and right side wall portions that extend vertically downward from left and right ends of the top wall portion, and forming the interference-avoiding portion to have a squared U-shaped cross section and to be formed from an inner face of the top wall portion and the left and right side wall portions.

19. The process for producing an adjusting device of front and rear positions of a seat according to claim 17, further comprising the step of forming the linking part to have a top wall portion that covers an upper side of the transmission member and left and right side wall portions that extend obliquely downward from left and right ends of the top wall portion so as to widen in going toward tips of the side wall portions, respectively, and forming the interference-avoiding portion, which has a peak-shaped cross section, from an inner face of each of the top wall portion and the left and right side wall portions.

\* \* \* \* \*